(12) United States Patent
Raveendrappa et al.

(10) Patent No.: US 11,173,889 B2
(45) Date of Patent: Nov. 16, 2021

(54) DISC BRAKE ASSEMBLY

(71) Applicant: Meritor Heavy Vehicle Braking Systems (UK) Limited, Gwent (GB)

(72) Inventors: Dhananjaya Raveendrappa, Bangalore (IN); Sanjeev Kulkarni, Bangalore (IN); Martin P. Taylor, Gwent (GB); Matthew McGinn, Gwent (GB); Pradeep Mirji, Bangalore (IN)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 181 days.

(21) Appl. No.: 16/393,046

(22) Filed: Apr. 24, 2019

(65) Prior Publication Data
US 2019/0329754 A1  Oct. 31, 2019

(30) Foreign Application Priority Data

Apr. 30, 2018 (EP) .................................... 18170162

(51) Int. Cl.
| | |
|---|---|
| *F16D 65/56* | (2006.01) |
| *F16C 19/32* | (2006.01) |
| *B60T 17/08* | (2006.01) |
| *B60T 13/575* | (2006.01) |
| *B60T 15/02* | (2006.01) |

(52) U.S. Cl.
CPC .......... *B60T 17/085* (2013.01); *B60T 13/575* (2013.01); *B60T 15/024* (2013.01)

(58) Field of Classification Search
CPC ...... F16D 55/226; F16D 55/227; F16D 65/18; F16D 65/567; F16D 66/02; F16D 66/026; F16D 66/028; F16C 19/32

USPC ......... 188/71.7, 71.8, 71.9, 72.1, 72.8, 72.9, 188/79.51

See application file for complete search history.

(56) References Cited

U.S. PATENT DOCUMENTS

| | | | | |
|---|---|---|---|---|
| 7,234,873 | B2* | 6/2007 | Kato | ....................... F16C 33/56 |
| | | | | 384/572 |
| 10,683,904 | B2* | 6/2020 | Mack | .................... F16D 66/028 |
| 2017/0108068 | A1* | 4/2017 | Sandberg | .............. F16D 55/226 |
| 2017/0122394 | A1* | 5/2017 | Sandberg | ................ F16D 65/18 |
| 2021/0108690 | A1* | 4/2021 | Onnestam | ............... F16D 65/18 |

FOREIGN PATENT DOCUMENTS

| | | |
|---|---|---|
| CN | 200961650 Y | 10/2007 |
| CN | 101093002 A | 12/2007 |
| CN | 101529105 A | 9/2009 |

(Continued)

OTHER PUBLICATIONS

European Patent Office, Extended European Search Report for corresponding European Application No. 19169855.4-1012, dated Jul. 9, 2019.

(Continued)

*Primary Examiner* — Christopher P Schwartz
(74) *Attorney, Agent, or Firm* — Brooks Kushman PC

(57) ABSTRACT

A brake assembly including an operating shaft, a yoke, and a rotating element. The rotating element bearing may be positioned between a convex bearing surface of the operating shaft and a concave bearing surface of the yoke such that the rotating element bearing may be configured to move relative to the operating shaft and relative to the yoke during actuation of the brake.

18 Claims, 19 Drawing Sheets

(56) References Cited

FOREIGN PATENT DOCUMENTS

| | | |
|---|---|---|
| CN | 104019163 A | 9/2014 |
| CN | 106574678 A | 4/2017 |
| CN | 106662179 A | 5/2017 |
| DE | 19542696 A1 | 5/1997 |
| DE | 202010003732 U1 | 8/2010 |
| DE | 102014112241 A1 | 3/2016 |
| DE | 102016218410 A1 | 3/2018 |
| EP | 1852627 A2 | 11/2007 |
| EP | 2647865 A2 | 10/2013 |
| WO | 2013083857 A2 | 6/2013 |
| WO | 2014106672 A1 | 7/2014 |

OTHER PUBLICATIONS

European Patent Office, Extended European Search Report for European Application No. 18170162.4-1012, dated Nov. 9, 2018.
Chinese Office Action dated May 27, 2020, for related Chinese Appln. No. 201910349044.8; 13 Pages.

* cited by examiner

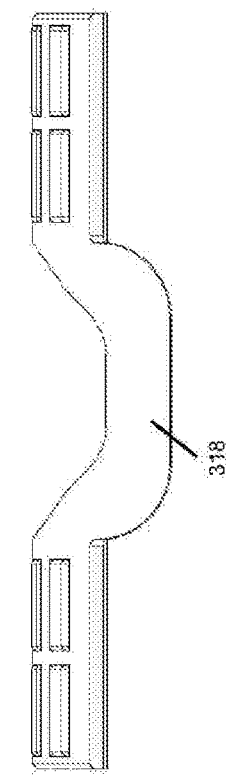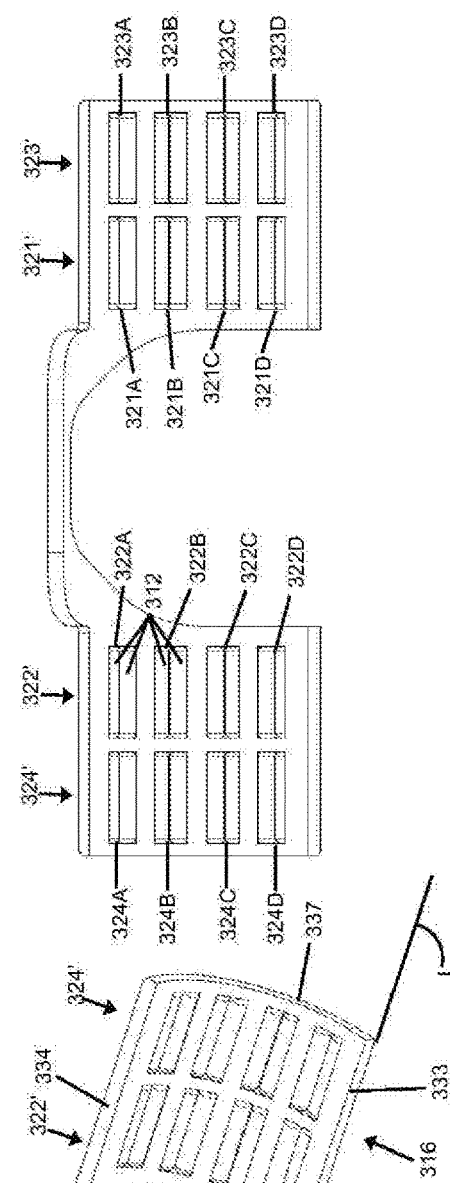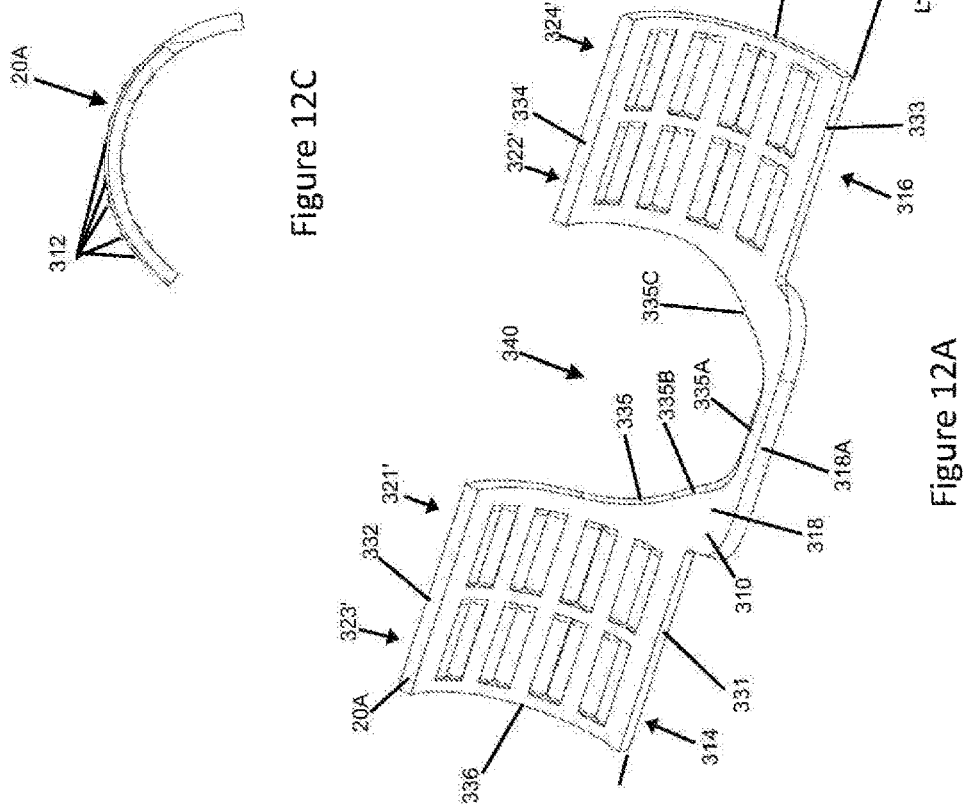

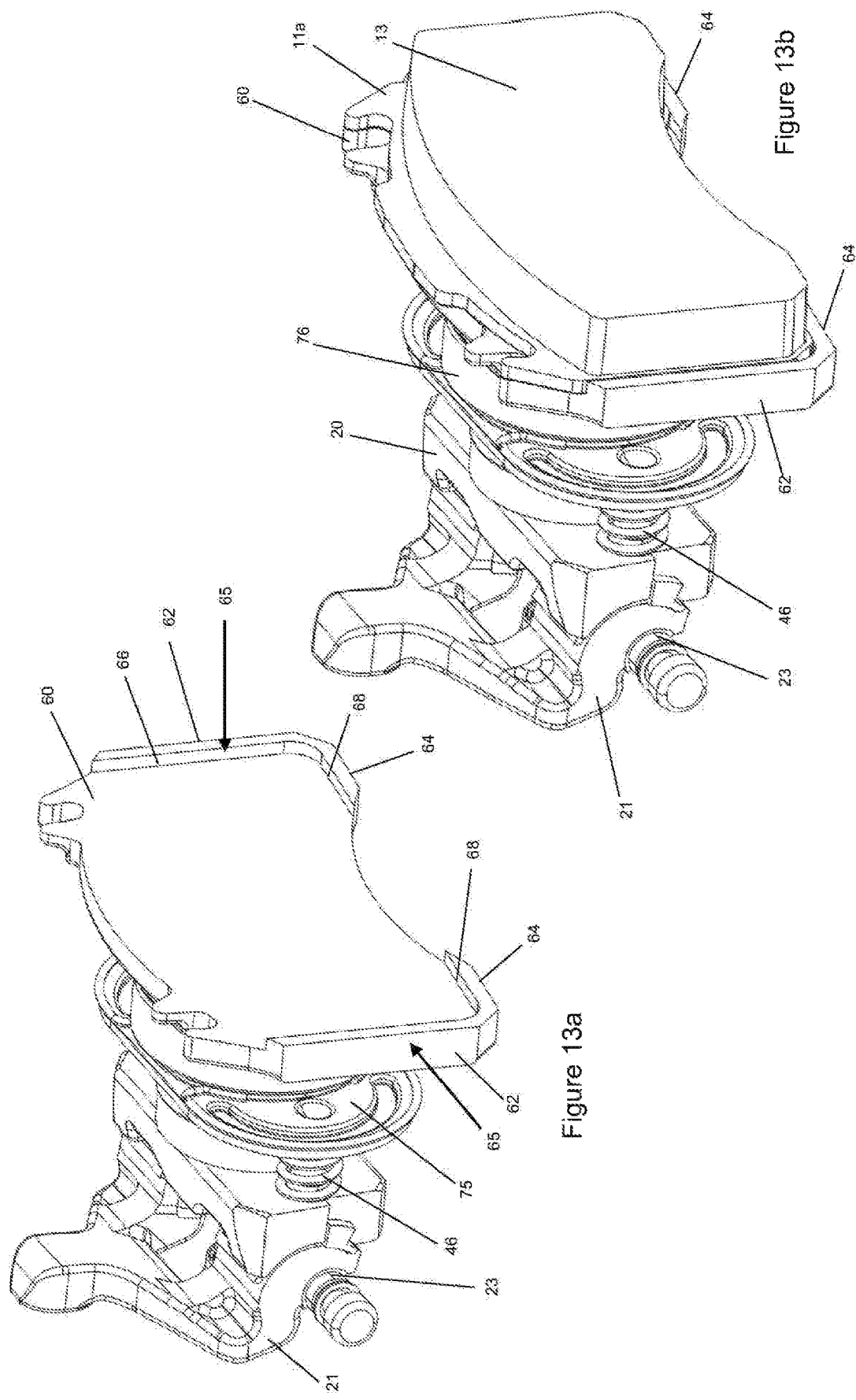

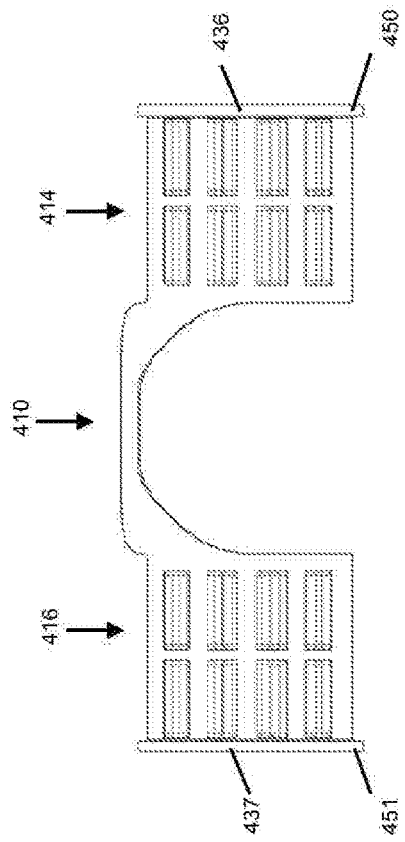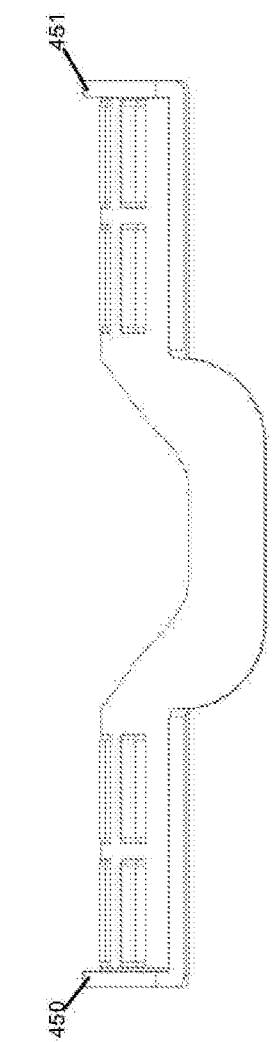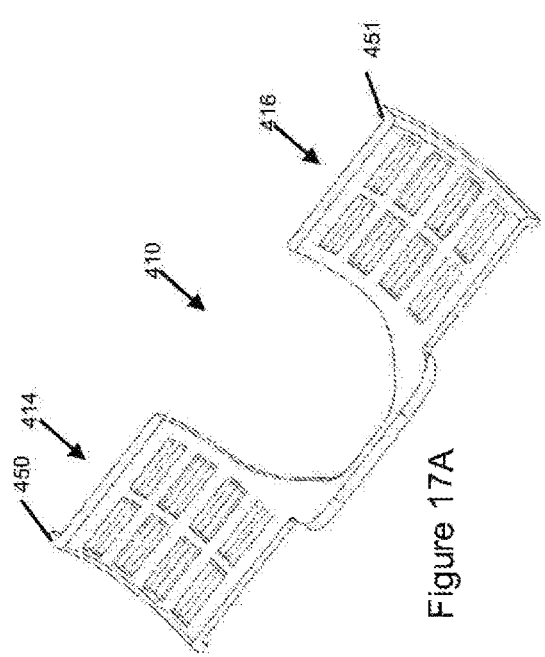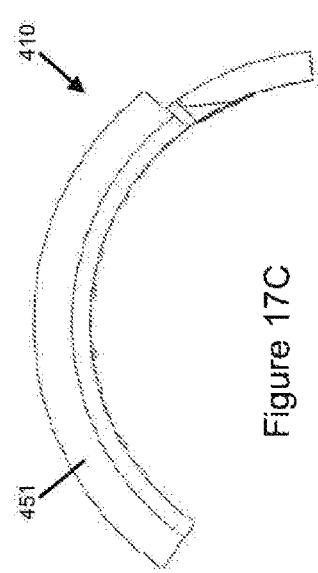

DISC BRAKE ASSEMBLY

TECHNICAL FIELD

The present invention relates to a disc brake assembly. More particularly, but not exclusively, the present invention relates to an air actuated disc brake assembly.

SUMMARY

According to an aspect of the present invention there is provided a brake assembly including an operating shaft configured to rotate about a first axis to actuate the brake, the first axis being defined by a body of the brake, the operating shaft including a convex bearing surface being arcuate and defining a second axis parallel to an offset from the first axis, a yoke having an arcuate concave bearing surface, the yoke being configured to move linearly relative to the body as the operating shaft rotates about the first axis, a rotating element bearing having a plurality of rotating elements retained by a cage, the cage having a first arcuate portion having a first array of apertures for receiving some of the plurality of rotating elements, the cage having a second arcuate portion having a second array of apertures for receiving some of the plurality of rotating elements, the first arcuate portion being connected to the second arcuate portion by a single elongate connecting portion, the rotating element bearing being positioned between the convex bearing surface and the concave bearing surface such that the rotating element bearing is configured to move relative to the operating shaft and relative to the yoke during actuation of the brake.

According to an aspect of the present invention there is provided a brake assembly including an operating shaft configured to rotate about a first axis to actuate the brake, the first axis being defined by a body of the brake, the operating shaft including a convex bearing surface being arcuate and defining a second axis parallel to an offset from the first axis, a yoke having an arcuate concave bearing surface, the yoke being configured to move linearly relative to the body as the operating shaft rotates about the first axis, a rotating element bearing having a plurality of rotating elements retained by a cage, the cage having a first arcuate portion having a first array of apertures for receiving some of the plurality of rotating elements, the cage having a second arcuate portion having a second array of apertures for receiving some of the plurality of rotating elements, the first arcuate portion being connected to the second arcuate portion by an elongate connecting portion, the rotating element bearing being positioned between the convex bearing surface and the concave bearing surface such that the rotating element bearing is configured to move relative to the operating shaft and relative to the yoke during actuation of the brake wherein the brake assembly is configured to have a rest position wherein the operating shaft, rotating element bearing and yoke are in a first position relative to each other and is configured to have an actuated position wherein the operating shaft, rotating element bearing and yoke are in a second position relative to each other wherein a primary circumferential edge (332) of the cage is connected to a secondary circumferential edge (334) by a tertiary edge (335) of the cage wherein with the brake assembly in the rest position a first region (335A) of the tertiary edge engages a component of the brake assembly to prevent movement of the rotating element bearing in a first axial direction and a second region (335B) of the tertiary edge engages a component of the brake assembly to prevent movement of the rotating element bearing in a second axial direction opposite the first axial direction.

According to an aspect of the present invention there is provided a brake assembly including an operating shaft configured to rotate about a first axis to actuate a brake, the first axis being defined by a body of the brake, the operating shaft including a convex bearing surface being arcuate and defining a second axis parallel to an offset from the first axis, a yoke having an arcuate concave bearing surface, the yoke being configured to move linearly relative to the body as the operating shaft rotates about the first axis, a rotating element bearing having a plurality of rotating elements retained by a cage assembly, the cage having a first arcuate portion having a first array of apertures for receiving some of the plurality of rotating elements, the cage having a second arcuate portion having a second array of apertures for receiving some of the plurality of rotating elements, wherein the first arcuate portion and second arcuate portion are separate components not physically connected to one another, the rotating element bearing being positioned between the convex bearing surface and the concave bearing surface such that the rotating element bearing is configured to move relative to the operating shaft and relative to the yoke during actuation of the brake.

The brake assembly may be configured to have a rest position wherein the operating shaft, rotating element bearing and yoke are in a first position relative to each other. The brake assembly may be configured to have an actuated position wherein the operating shaft, rotating element bearing and yoke are in a second position relative to each other.

The first circumferential edge may be connected to the second circumferential edge by a sixth edge having a first formation. The third circumferential edge may be connected to the fourth circumferential edge by a seventh edge having a second formation. The yoke may comprise a first formation. The yoke may also comprise a second formation.

With the brake assembly in the rest position, the first formation on the yoke may engage the first formation on the sixth edge of the cage to help prevent movement of the rotating element bearing in a second axial direction. The second formation on the yoke may engage the second formation on the seventh edge of the cage, to help prevent movement in a first axial direction opposite the second axial direction.

The first formation on the yoke may be a first groove. The first formation on the sixth edge may be a first flange projecting axially from the cage. The second formation on the yoke may be a second groove. The second formation on the seventh edge may be a second flange projecting axially from the cage.

BRIEF DESCRIPTION OF THE DRAWINGS

Embodiments of the present invention will now be described, by way of example only, with reference to the accompanying drawings, in which:

FIG. 12A to 12D show various views of a rotating element bearing used in the brake assembly of FIG. 1;

FIG. 13a is a detail view of a spreader plate and the actuator arrangement of the brake assembly of FIG. 1, with no inboard brake pad included;

FIG. 13b is the same view as FIG. 13a but with the inboard brake pad included;

FIGS. 17A to 17D show various views of a different rotating element bearing;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Actuation

Figure 1:
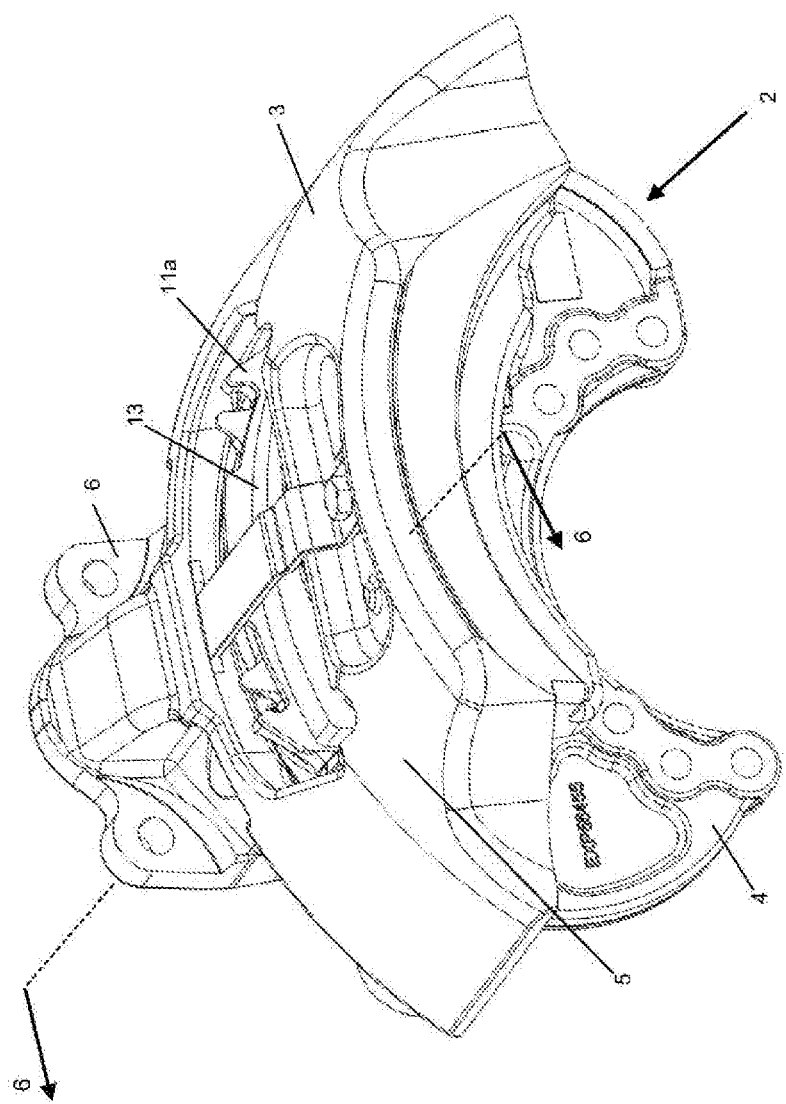
FIG. 1 is an isometric view of a disc brake assembly according to the present invention.
Figure 2:
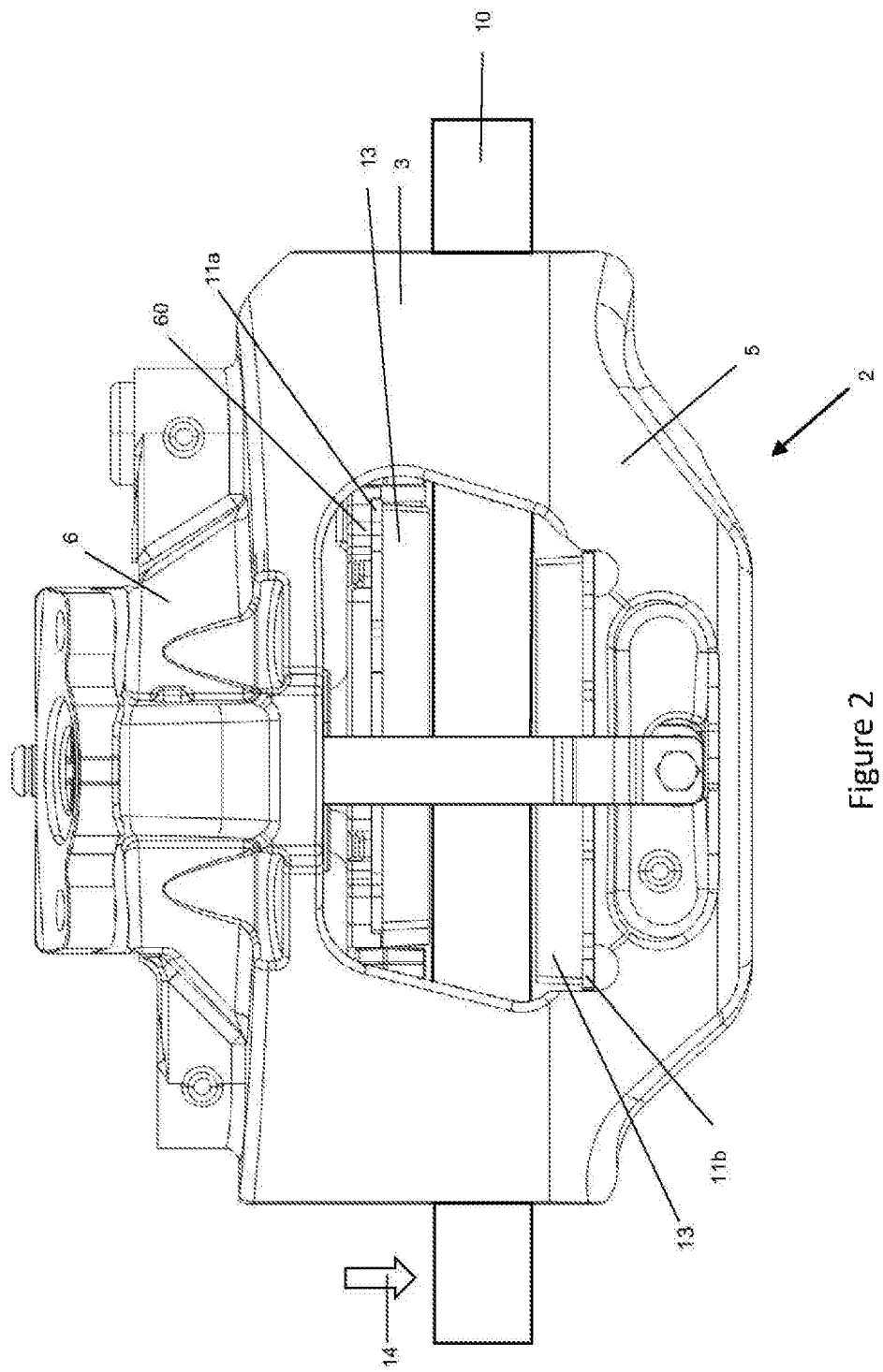
FIG. 2 is a plan view of the brake assembly of FIG. 1, with a brake rotor in situ.
Figure 3:
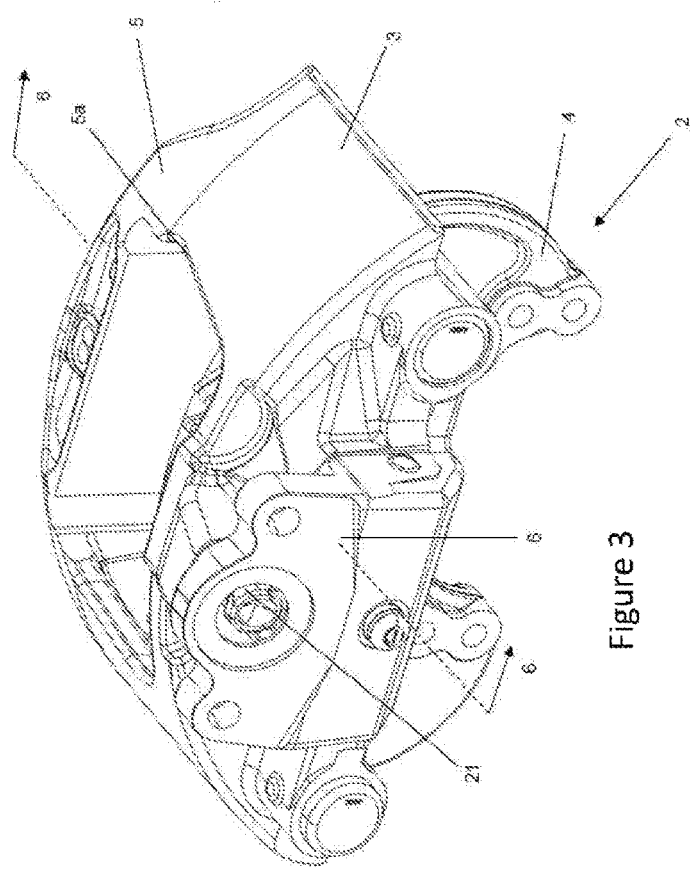
FIG. 3 is an isometric view of the brake assembly of FIG. 1 from an inboard direction, with the inboard and outboard brake pads omitted for clarity.

FIGS. 1, 2 and 3 illustrate a brake assembly 2 of the present invention, in this case a disc brake assembly. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

Figure 4:
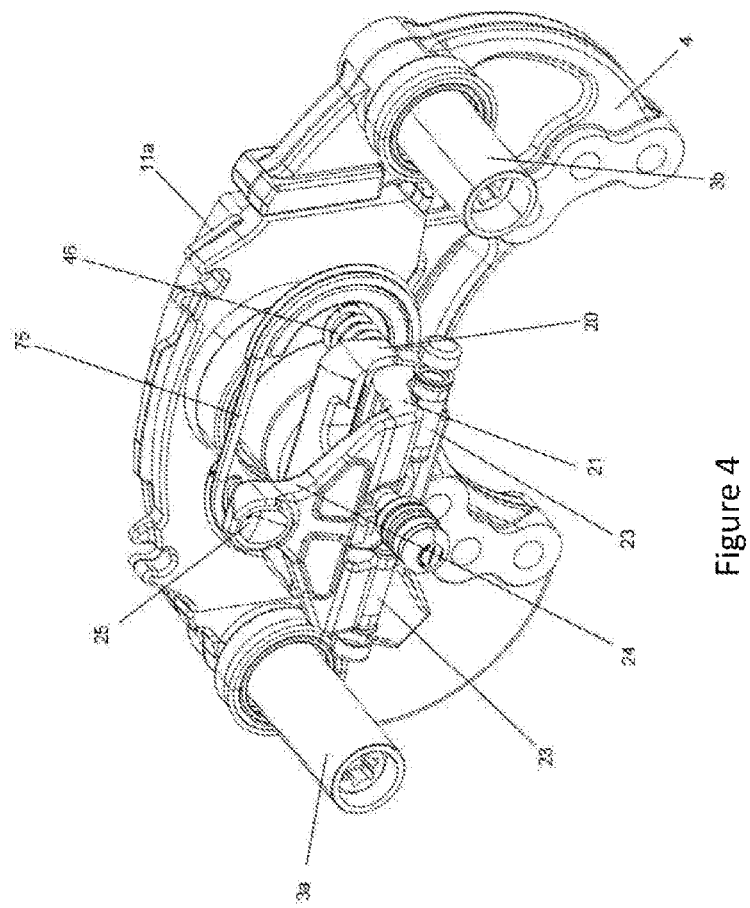
FIG. 4 is an isometric view of the brake assembly of FIG. 1 from an inboard direction, with the outboard brake pad and a caliper housing of the brake omitted for clarity.

As can be seen from the view in FIG. 4 with the housing 6 omitted, the caliper 3 can slide on the carrier 4, by way of first and second guide pins 3a, 3b. In this embodiment, the first guide pin 3a is longer than the second guide pin 3b.

An inboard brake pad 11a comprises a layer of friction material 13 and is arranged so that the friction material 13 faces a brake rotor 10 (also known as a brake disc). The inboard pad 11a is mounted to a brake pad support arrangement. In this embodiment, the inboard brake pad support arrangement is a spreader plate 60, described in more detail below. The pad 11a is moveable in the direction of arrow 14 (see FIG. 2) against the brake rotor 10 (example of rotor shown schematically in FIG. 2).

An outboard pad 11b, also with a layer of friction material 13, is also provided. The outboard pad 11b is mounted to a further brake support arrangement. Suitable means are provided to urge an outboard brake pad 11b against the opposite side of the rotor 10. In this embodiment, such means comprises a bridge 5 arranged so as to straddle the rotor 10 and to transmit the reaction force from an inboard operating shaft 21 to the outboard pad 11b. In this embodiment the housing 6 and bridge 5 are manufactured as a single monolithic casting, but in other embodiments, the bridge may be bolted or otherwise secured to the housing. In this embodiment, the inboard and outboard brake pads 11a, 11b are mounted asymmetrically across an axis parallel to the brake rotor 10. As described in more detail below, the inboard pad 11a is mounted in a position that is laterally offset from the actuation mechanism, i.e., the line of action of the actuation mechanism does not pass through the mid-point of the inboard pad in a circumferential direction. The outboard pad 11b is mounted directly opposite the actuation mechanism, i.e., it is not laterally offset; the line of action of the actuation mechanism does pass through the mid-point of the outboard pad 11b in a circumferential direction when the pad 11b is mounted.

Figure 5:
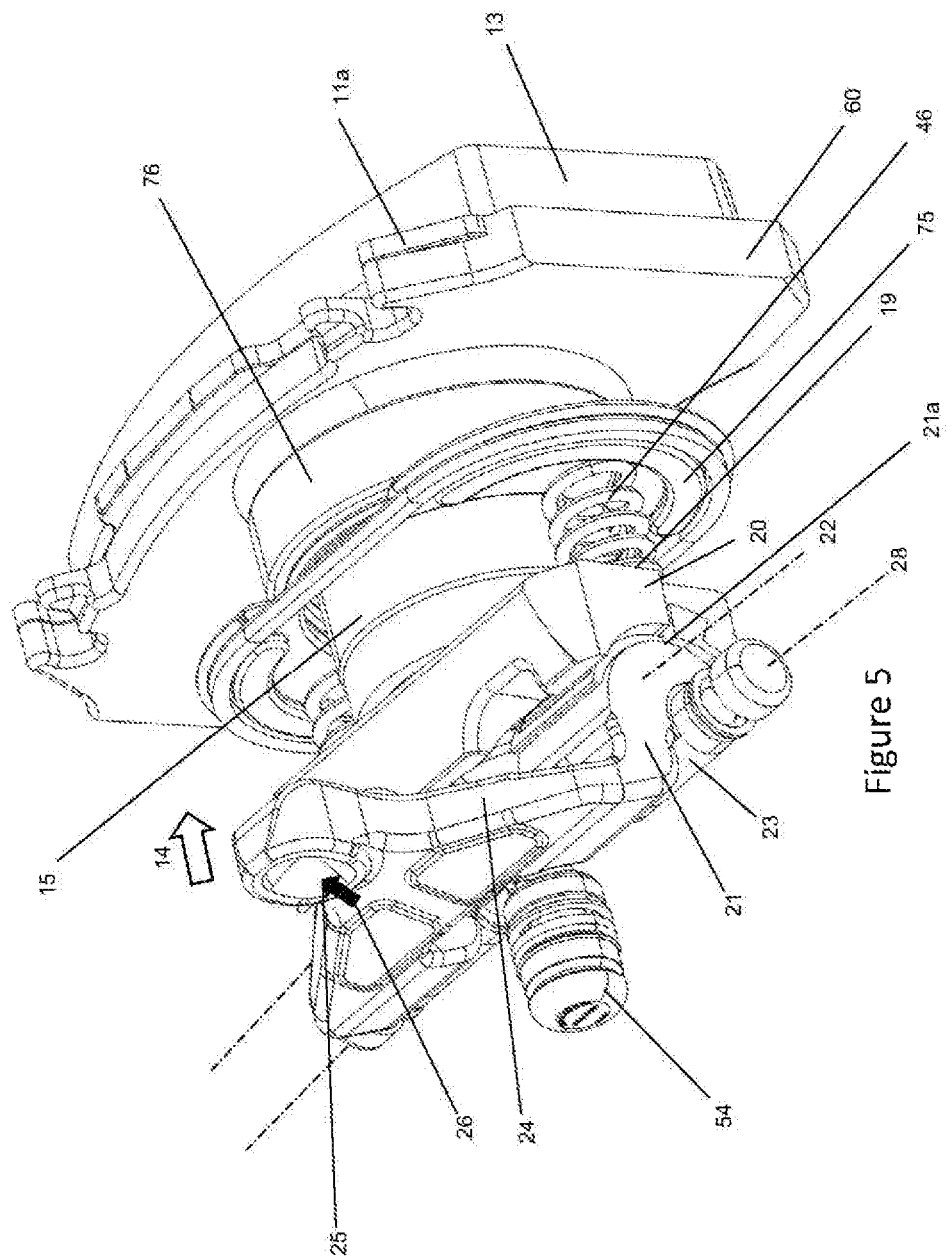
FIG. 5 is an isometric view showing an actuator arrangement of the brake assembly of FIG. 1, with the inboard brake pad included.
Figure 6:
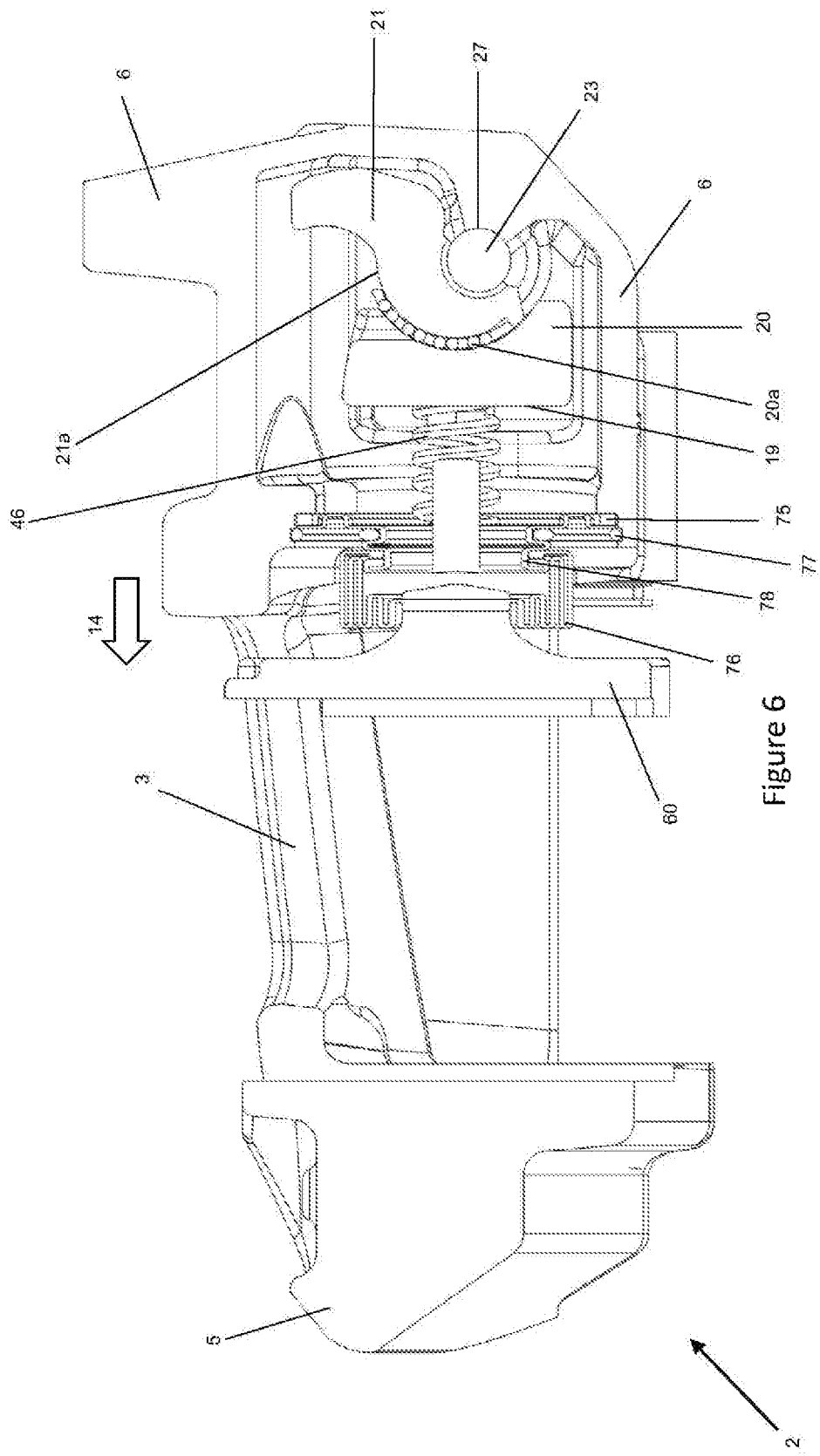
FIG. 6 is a cross-sectional view through an inboard-outboard radial plane 6-6 of the brake assembly of FIG. 1, with no brake pads included.

With reference to the cut-away view of FIG. 5 and cross-section of FIG. 6 in particular, the inboard actuation mechanism comprises a single brake piston 15 (not shown on FIG. 6 for clarity), slidable in the direction of arrow 14 (i.e., inboard-outboard) relative to the rotor 10 (not shown in FIG. 5, for clarity).

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface 27, each surface 27 being defined in the housing and being curved to accept the roller 23. The transverse axis 28 is therefore defined by the housing 6.

Convex surfaces 21a of the operating shaft 21 are located opposite the roller 23. The operating shaft has an axis 22, being the radial center of the arc defined by surfaces 21a, which is parallel and offset from the axis 28. The curved surface 21a locates in a semi-circular recess of a yoke 20. A surface 19 of the yoke 20 opposite the recess is in contact with an inboard end face of the piston 15. The operating shaft 21 further comprises a lever 24 having a pocket 25 adapted to receive an output push rod (not shown) of a brake actuator (e.g., an air chamber). The lever 24 is, in this embodiment, shaped as an inverted "U" (see FIGS. 4 and 10 in particular) and the line of action of the brake actuator (from pocket 25) is substantially over the line of action of the piston 15.

Located between the curved surface 21a and the recess of the yoke 20, on either arm of the 'U' is a rotating element bearing 20a, to enable the operating shaft 21 to pivot around the roller 23, in the recess of the yoke 20.

The yoke 20 further includes a sleeve portion 40, which projects axially outboard from the yoke 20. The yoke 20 has a through bore extending axially through its center, the bore also extending through the center of the sleeve portion 40. In this embodiment, the sleeve portion 40 and yoke 20 are separate components that are fixed together during assembly, in any suitable way, but in alternative embodiments the sleeve portion 40 and yoke 20 are integral.

Application of a force in the direction of arrow 26 (FIG. 5) causes pivoting movement of the operating shaft 21 about the rollers 23 and the curved surface 21a bears via the rotating element bearing on the yoke 20. The offset axes 28 and 22 cause the yoke 20 to move in the direction of the piston 15, contacting the piston 15 and causing the piston 15 to urge the friction material 13 of the brake pad 11a directly against the rotor 10. A reaction force from the operating shaft 21 is transmitted to the bearing surface 27 of the caliper 3 via the rollers 23 and is then transmitted to the outboard pad 11b via the bridge 5, with the friction material 13 of the outboard pad 11b being urged against the rotor 10, such that the pads 11a and 11b clamp the rotor and effect braking through a frictional brake force. In this embodiment, it should be noted that the piston is not itself directly guided with the caliper. Rather, at the outboard end the position of the piston transverse its line of action is determined by interaction of a spreader plate with the brake carrier as described in more detail below.

Wear Adjustment

A wear adjuster mechanism 30 to maintain a desired running clearance between the rotor 10 and pad 11a, 11b is described below. Generally, the operating shaft 21 is connected to a one-way clutch to transfer any rotation of the operating shaft beyond a predetermined degree. Between the one-way clutch and operating shaft are a driving link member, which is driven by the operating shaft, and a driven link member which is driven by the driving link member and drives the one-way clutch. The one-way clutch has a driving portion configured to rotate if the driven link member rotates, and a driven portion mounted on the driving portion, that is driven by the driving portion of the one-way clutch. With particular reference to FIGS. 7, 8, 9 and 10, in this embodiment the operating shaft 21 includes a sector of a bevel drive gear 33 which extends inwardly from the side thereof parallel to the axis of rotation 22. The drive gear 33 acts as the driving link member and is in driving engagement with a central driven bevel gear 34 that acts as the driven link member and is located between the two arms of the operating shaft 21, generally in line with the piston 15. The bevel gear 34 is in driving engagement with a drive drum 35 that is arranged concentrically with the piston 15 and acts as the driving portion of the one-way clutch.

The drive drum 35 is made up of a collar portion 35a at its inboard end and an axially extending projecting 'finger' portion 35b, of a smaller diameter than the collar portion 35a, that extends outboard from the collar portion 35a, concentric with the piston 15. In this embodiment, located adjacent and outboard of the collar portion 35a of the drive drum 35, and concentric radially outward from the finger portion 35b of the drive drum 35, is a driven drum 37. The driven drum 37 acts as the driven portion of the one-way clutch and is mounted on the drive drum 35. The driven drum 37 comprises a plurality of axially extending recesses 38 which are arranged to accommodate corresponding lugs projecting radially inwardly from input plates 41a of a friction clutch 41. In other embodiments alternative arrangements for driving the clutch input plates are contemplated e.g., a different number of recesses, or projections rather than recesses. A wrap spring 39 is frictionally wrapped around outer circumferential surfaces of the collar portion 35a of the drive drum 35 and the driven drum 37, such that it bridges the two components and enables the two components to act as a one-way clutch. The wrap spring 39 can easily bridge the two components, as they are both cylindrical and have the same outer diameter at the location point where the wrap spring 39 engages. In other embodiments other suitable one-way clutches may be utilized, such as ball and ramp, or roller clutch/sprag clutch arrangements.

Figure 9:
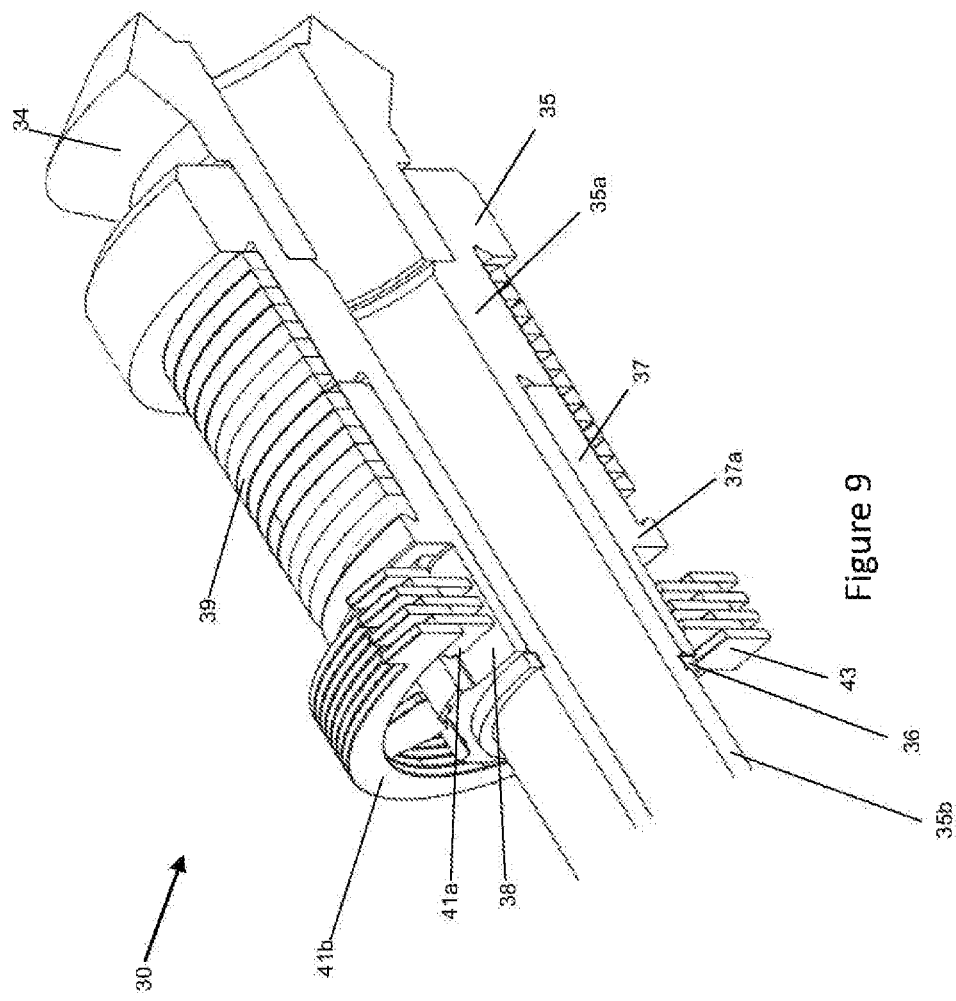
FIG. 9 is a detail view of an adjustment mechanism of the brake assembly of FIG. 1.

The friction clutch 41 comprises output plates 41b positioned between the input plates 41a (see FIG. 9 for more detail). The output plates 41b of the clutch 41 have diametrically opposite radially outwardly facing lugs 43, which are not present on the input plates 41a.

The driven drum 37 is retained relative to the drive drum 35 by a retaining ring such as a circlip 36 that is located in a recess in the outer surface of the finger portion 35b of the drive drum 35, adjacent the outboard end of the driven drum 37. A stop 44 projects radially inwardly from the inner piston 15b, adjacent and outboard of a circumferential shoulder portion 37a that projects radially outwardly from the driven drum 37. However, there is a clearance between the stop 44 and the shoulder portion 37a of the driven drum 37. The wrap spring 39 is retained in the axially outboard direction by the shoulder portion 37a of the driven drum 37, and in the axially inboard direction by the collar portion 35a of the drive drum 35.

Figure 7:
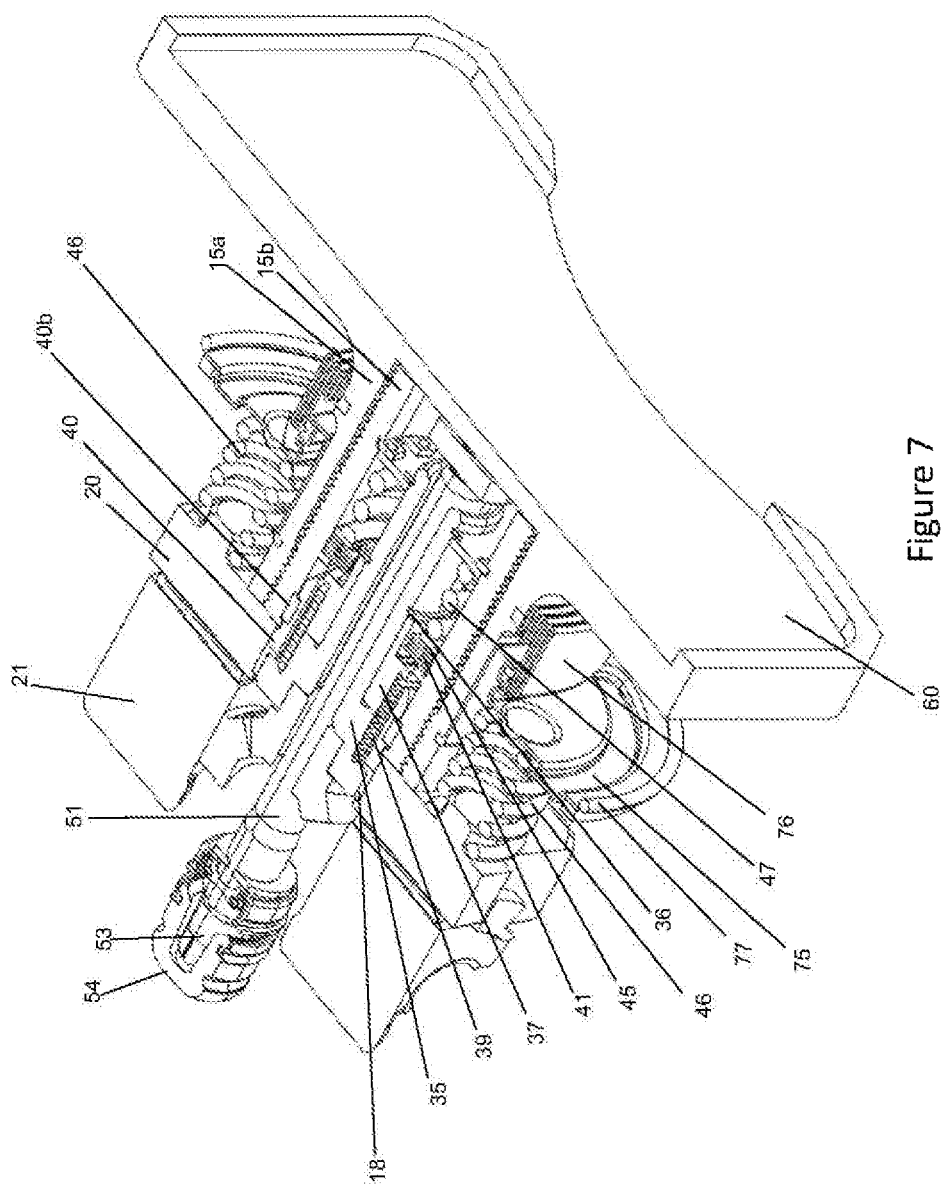
FIG. 7 is an isometric cross-sectional view through an inboard-outboard horizontal plane of the actuator arrangement of the brake assembly of FIG. 1.
Figure 8:
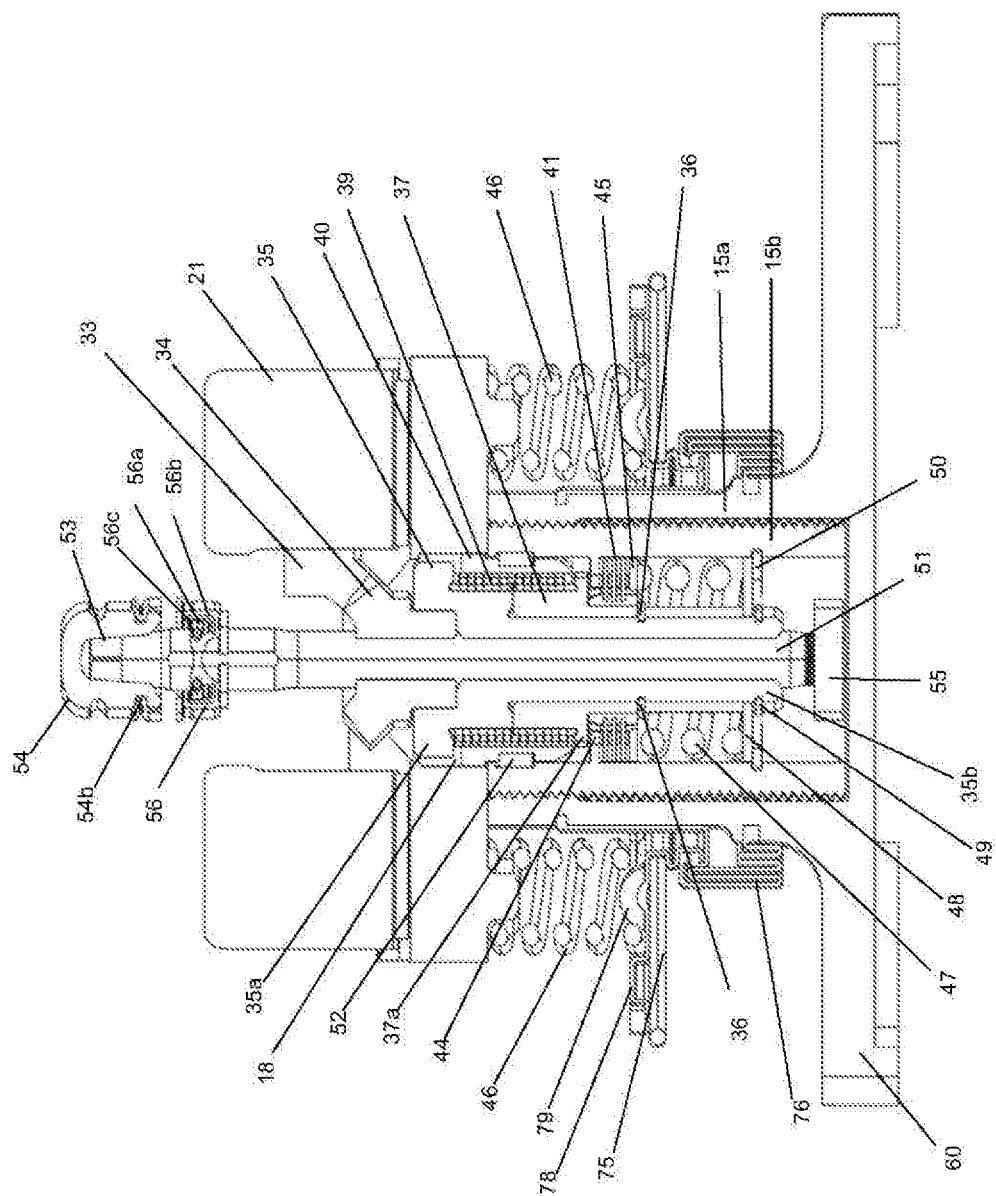
FIG. 8 is a plan view of the cross-sectional view of FIG. 7.

As can be seen most clearly from FIGS. 7 and 8, the drive drum 35 is restrained from moving in an outboard direction by a bush 18. The bush 18 is an interference fit with the through bore of the yoke 20 and has a radially inwardly projecting lip at its outboard end, such that an L-shape is defined in cross section. An inboard surface of the lip engages the collar 35a of the drive drum 35, to retain the drive drum 35 from moving axially outboard, once the brake is assembled. The bush 18 also engages a radially outer surface of the collar 35a of the drive drum 35, to restrain the drive drum 35 from moving radially, and to take radial loads that pass from the bevel gear 34 through the drive drum 35. There is a clearance between the bush 18 and the wrap spring 39.

The piston 15 comprises an outer piston 15a having an internal female thread, and an inner portion or inner piston 15b, having a complimentary external male thread. Therefore, in this embodiment the inner piston 15b is located within the outer piston 15a. The inner piston 15b has at least one recess in its inner surface. In this embodiment, the recesses are two longitudinally extending channels 42 located diametrically opposite one another. When the adjuster mechanism 30 is assembled, the lugs 43 of the output plates 41b of the clutch 41 locate within the channels 42, to key the output plates 41b to the inner piston 15b. Therefore, rotation of the output plates 41b results in rotation of the inner piston 15b.

The components above, that are located between the operating shaft and inner and outer piston, define a transmission path of the wear adjuster mechanism 30.

When the adjuster mechanism 30 is assembled, the sleeve portion 40 of the yoke 20 is located concentrically between the wrap spring 39 and the inner piston 15b. The sleeve portion 40 is restrained from rotating, as it is secured to, or integral with, the yoke 20, which is also configured to be non-rotatable when assembled in the disc brake. However, as described in more detail later, the inner piston 15b is configured to rotate during an adjustment operation, to cause the piston 15 to advance in the direction of the inboard brake pad 11a. A friction element is located between the non-rotatable sleeve portion 40 of the yoke 20 and the rotatable inner piston 15b. The friction element helps to inhibit undesired vibration-induced torque from affecting the adjustment mechanism in operation, and causing undesired de-adjustment of the disc brake. Advantageously, the friction element provides a consistent friction torque but in a small space envelope.

The friction element is preferably configured to resist relative rotation of the yoke 20 and the inner portion 15b of the piston 15 with a torque greater than the torque required to cause the one-way clutch of the adjuster mechanism (in this case the wrap spring 39) to slip when the actuation force is released at the end of a braking operation. This helps to ensure that the one-way clutch slips rather than permits unwanted de-adjustment of the brake occurring during brake release.

In this embodiment, the sleeve portion 40 has a circumferential recess 40a on its external surface that is arranged to line up with a corresponding circumferential recess 40b on the internal surface of the inner piston 15b, adjacent the inboard end of the inner piston 15b. In this embodiment, the friction element is a radial expander 52, also known as a marcel expander. An example of suitable components may be those supplied by the Smalley Steel Ring Company of Lake Zurich, Ill., USA.

The radial expander 52 is located in the annulus defined by these recesses 40a, 40b. The radial expander 52 is a wave formed length of wire or metal sheet that has been formed into an open ring, which, as well as producing a radial force to provide resistance to rotation, retains the yoke 20 relative to the inner piston 15b axially. More specifically, the radial expander provides resistance to vibration induced torque that can occur during use of the brake, as well as helping to ensure that movement of the yoke in an axially inboard direction is transferred to the piston. For example, following a braking operation, when the actuation mechanism is reset, axial movement of the yoke results in axial movement of the piston. As the friction element itself retains the yoke relative to the second portion of the piston, there is no need for extra clips or other components, keeping the number of parts within the disc brake low. Further, because no additional clips are needed, manufacturing costs are reduced, as there is no need to machine the relevant features required for fitting clips to.

In this embodiment, the radial expander 52 is biased in both radial directions. In other words, the radial expander 52 is configured to exert a force in both a radially inward and a radially outward direction when constrained within the annulus, such that it contacts the radially outward facing surface of the recess 40a of the sleeve portion 40, as well as the radially inward facing surface of the recess 40b of the internal surface of the inner piston 15b, to provide a force and therefore a frictional resistance to the relative rotation of the sleeve portion 40 with respect to the radial expander 52 and of the inner piston 15b with respect to the radial expander 52.

To fit the radial expander 52, in this embodiment, the radial expander 52 is compressed, e.g., with a mandrel, before being inserted into the recess 40b of the internal surface of the inner piston 15b. The inner piston 15b would then be slid onto the outboard end of the sleeve portion in an inboard direction, until the radial expander 52 locates in the annulus defined by the recesses 40a, 40b.

In this embodiment, as can be seen most clearly in FIG. 8, the sleeve portion 40 has a chamfer at its outboard end, from the external surface of the sleeve portion 40 to the outboard face of the sleeve portion. This chamfer results in the outboard end of the sleeve portion 40 being tapered in an outboard direction. As the extreme outboard end of the sleeve portion 40 therefore has a smaller outer diameter than the remainder of the sleeve portion 40 that is inboard of the outboard end, fitting of the radial expander 52 is made easier, as the tapered external surface at the outboard end acts as a guide surface for fitting the inner piston 15b and radial expander 52 onto the sleeve portion 40.

The wear adjuster mechanism 30 additionally comprises a pressure plate 45 located outboard and engaging the friction clutch 41. An outboard face of the pressure plate 45 is acted on by a compression spring 47, the compression spring 47 being arranged concentrically between the pressure plate 45 and a washer 48 in order to load the friction clutch 41, and generate the required amount of friction to control the torque at which the friction clutch 41 slips. A retaining ring 49 is provided that is located in a circumferential recess in the outer surface of the finger portion 35b of the drive drum 35, adjacent the outboard end of the drive drum 35. The ring 49 is an assembly aid, to help locate the adjustment mechanism during assembly, e.g., at a sub-assembly stage when all components are not yet installed. The washer 48 is retained by a retaining ring such as a snap ring 50, located concentric with and radially outward of the ring 49, and located in a circumferential recess in the outer surface of the inner piston 15b. In this embodiment, the snap ring 50 provides support for the washer 48, to help load the friction clutch 41. The washer also helps to radially locate the finger portion 35b of the drive drum 35.

In this embodiment, the outer piston portion 15a is integral (i.e., formed monolithically from the same material by casting, or forging, for example) with the spreader plate 60. The spreader plate 60 locates the inboard brake pad 11a, as well as engages surfaces of the carrier 4. Therefore, the interaction of the spreader plate 60 and carrier 4 prevent rotation of the outer piston 15a in use (described in more detail below).

In order to maintain a desired running clearance between the brake pads and rotor, the wear adjuster mechanism 30 is required to periodically advance the inboard brake pad 11a towards the rotor 10 to account for the loss of friction material 13, and to a lesser extent loss of material from the face of the rotor 10, due to wear.

A predetermined amount of play or backlash is provided in the system between the teeth of the drive gear 33 and the teeth of the bevel gear 34 (or between the pin and slot, or between the lugs of the input plates 41a of the clutch and the recesses 38, in other arrangements not shown in the figures).

In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via the drive drum 35 to the wrap spring 39, causing the wrap spring 39 to rotate around the drive drum 35 and driven drum 37 in a direction which causes the wrap spring 39 to tighten, transmitting the rotation from the drive drum 35 to the driven drum 37. More specifically, this rotation is transmitted as the wrap spring bridges the two components, i.e., a first end of the wrap spring 39 engages an outer surface of the drive drum 35 and a second end of the wrap spring 39 engages an outer surface of the driven drum 37. Rotation of the driven drum 37 causes rotation of the input plates 41a of the friction clutch 41, due to the interaction of the recesses 38 and the lugs of the input plates 41a. Rotation of the input plates 41a results in rotation of the output plates 41b, due to the friction between the input and output plates 41a, 41b. As the lugs 43 of the output plates 41b engage the channels 42 of the inner piston 15b, the inner piston 15b is also caused to rotate.

Since the outer piston 15a is restrained from rotation by the engagement of the spreader plate 60 and the carrier 4, this causes a lengthening of the piston 15 to reduce the running clearance. At the point at which the friction material 13 comes into full contact with the rotor 10, the torque passing through the adjustment mechanism will start to increase. When this torque increases to a level that is higher than the maximum torque value of the friction clutch 41, the friction clutch 41 slips and further extension of the outer piston 15a is prevented. Once the braking operation ceases, return springs 46 act to urge the operating shaft 21 back to its rest position. A corresponding retraction of the inner piston 15b is prevented since the wrap spring 39 relaxes and does not transmit a reverse rotation to the driven drum 37.

Preferably, the radial expander 52 is configured to resist relative rotation of the yoke 20 and inner piston 15b with a torque greater than the torque required to cause the one-way clutch (in this case the wrap spring 39) to slip, when the actuation force is released at the end of a braking operation. This helps to ensure that the wrap spring 39 slips rather than permitting unwanted de-adjustment of the brake occurring during brake release.

The co-axial mounting of the adjuster mechanism 30 within the piston 15 minimizes the space required by the mechanism within the housing, resulting in a lighter, more compact housing.

As the wrap spring 39 directly engages the outer surface of the drive drum 35 and the driven drum 37, any potential backlash that may occur between the drive drum 35 and the wrap spring 39, or the driven drum 37 and the wrap spring 39, is minimized, which can help to reduce wear of the components. Uncontrolled unwinding of the wrap spring 39 is also minimized, which provides a more predictable, and hence controllable, friction level. The wear on the outer surfaces of the drums 35, 37 is also minimized. This could, for example, obviate the need to heat treat these outer surfaces, reducing manufacturing costs. The arrangement also helps to remove uncertainties that may arise after manufacturing of the components, for example unpredictable tolerances, which may affect the function of the system.

The shoulder portion 37a on the driven drum 37 and collar portion 35a of the drive drum 35 limits movement of the wrap spring 39 in the axially inboard and outboard directions, without the need for further separate circlips, or other similar retaining components.

Manual Rewind Apparatus

Once the friction material 13 has worn to its design limit, it is necessary for the brake pads 11a and 11b to be replaced. In order to accommodate the extra depths of unworn new pads as compared to worn old pads, it is necessary for the piston 15 to be rewound back to its retracted position.

Figure 10:
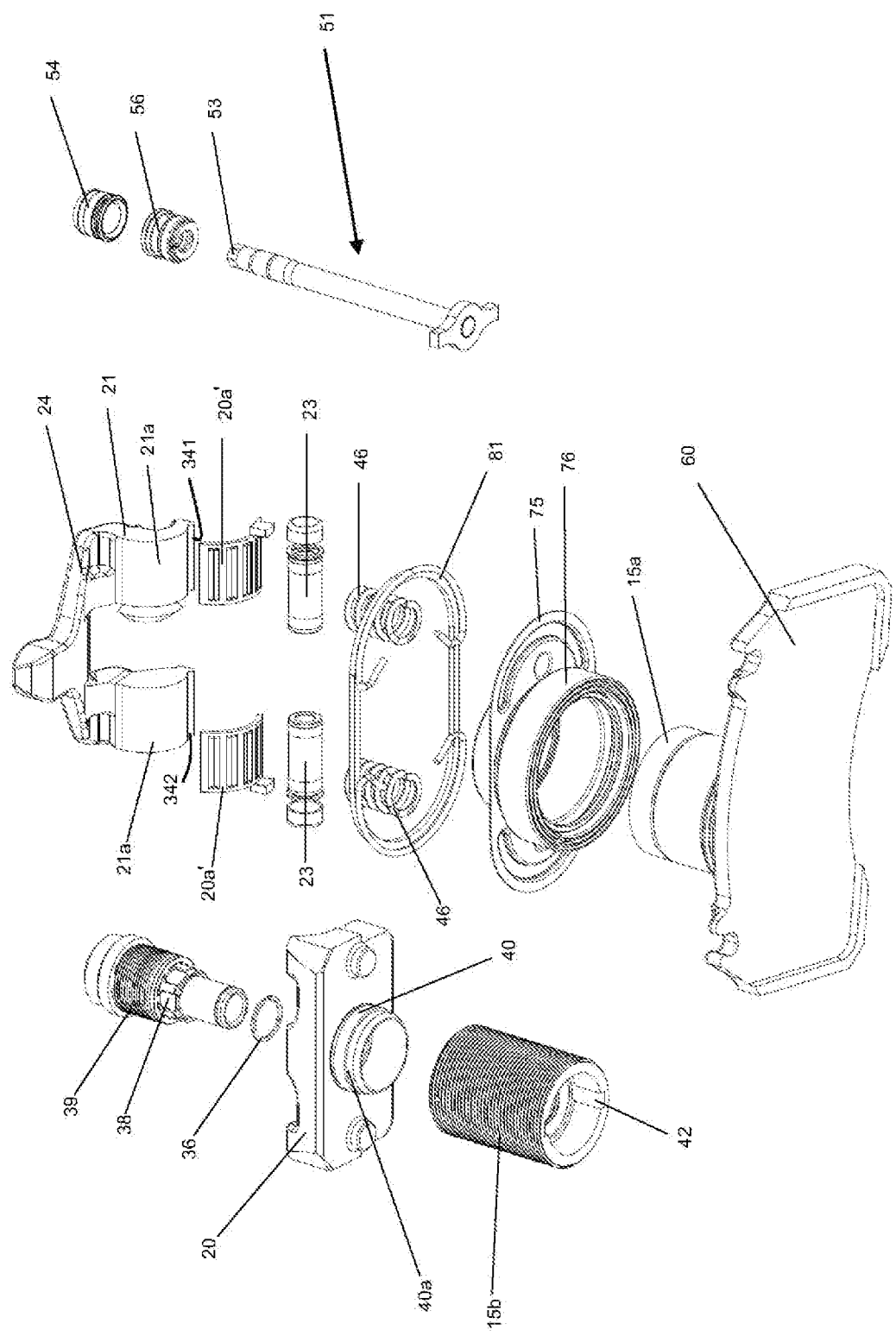
FIG. 10 is an exploded view of the actuator arrangement of the brake assembly of FIG. 1 with the rotating element bearing shown schematically.

To this end, a manual rewind apparatus incorporating an elongate manual rewind shaft 51 is provided (see FIGS. 7, 8 and 10). A hex head 53 or other suitable interface is provided at the outer (user accessible) longitudinal end of the rewind shaft 51. The hex head 53 has a cover 54, which is located on the hex head 53. In this embodiment, the cover 54 is a rubber cap. The cover 54 can be removed by a user when access to the hex head 53 is required. A spanner, wrench or other suitable tool may be attached to the hex head 53 to affect the rewinding operation.

Located outboard of the cover 54, is a collar 56. The collar 56 is generally annular and is configured to locate on the rewind shaft 51 adjacent the cover 54. The rewind shaft 51 is configured such that it can freely rotate within the collar 56 e.g., by use of one or more of suitable lubrication, coatings such as PTFE, or by the collar incorporating a lip seal that minimizes the contact areas between the collar and shaft. In this embodiment, the collar 56 includes a circumferential recess 56a facing inboard. Within the recess 56a are first and second sealing members 56b and 56c. In this embodiment, the first sealing member 56b is generally cup shaped, with a base having a central aperture, and sides projecting inboard, to define a general L-shape in cross-section on each side. The base of the sealing member engages with the collar 56 to substantially seal lubricant within the housing 6 of the brake and help prevent foreign material from contaminating the housing 6 of the brake. In this embodiment, the second sealing member 56c is a spring energized sealing ring that engages a slot in an internal surface of the recess 56a of the collar 56, to further help seal lubricant within the housing 6 of the brake, and help prevent foreign material from contaminating the housing 6 of the brake.

When the brake is assembled, the rewind shaft 51, collar 56, and cover 54 are located within a through bore, extending from an inboard surface of the caliper 3. The cover 54 is retained within the housing with a retaining member 54b, which locates within a circumferential slot 54a on the external surface of the cover 54, between the cover 54 and the bore of the caliper 3. In this embodiment, the retaining member 54b is an annular retainer with an inner surface that engages the outer surface of the cover 54, and circumferential protrusion projecting radially inwardly and engaging the slot 54a. Preferably, the retaining member 54b is metal.

Figure 11:
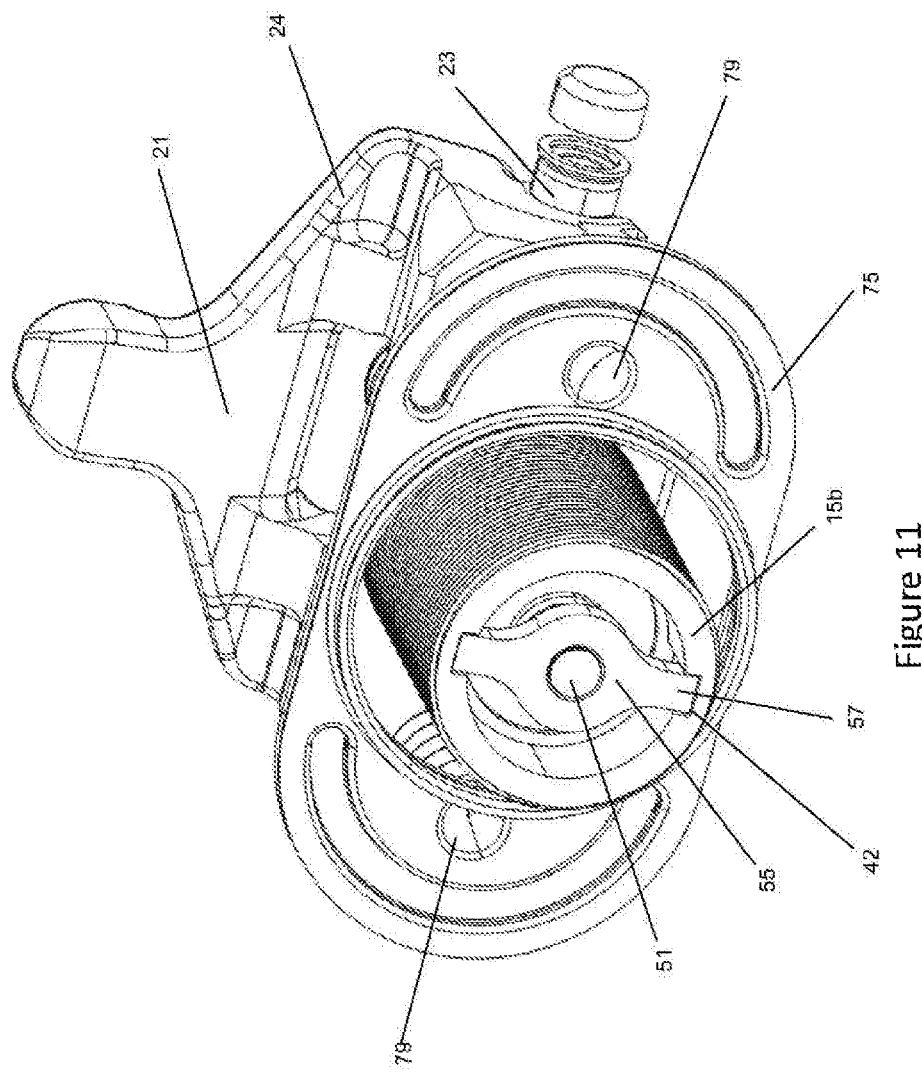
FIG. 11 is a detail view of an outboard end of a manual adjuster shaft of the brake assembly of FIG. 1.

The rewind shaft 51 is mounted concentrically and radially inwardly with respect to the components of the adjustment mechanism 30. At the outboard end longitudinally opposite the hex head 53, a piston engaging end piece 55 is mounted on the shaft 51. In this embodiment, the end piece 55 is circular in profile, with two diametrically opposed projections 57. As can be seen from FIG. 11, the end piece 55 and the projections 57 are dimensioned such that the projections 57 locate within the channels 42 of the inner piston 15b. The channels 42 allow the inner piston 15b to advance during a braking operation, whilst the shaft 51 is axially fixed.

In use during manual adjustment therefore, a user rotates the hex head 53 to rotate the rewind shaft 51. Due to the engagement between the projections 57 of the end piece 55 and the channels of the inner piston 15*b*, the inner piston 15*b* is caused to rotate, rewinding the piston 15 back to its original retracted position.

Mounting of Brake Pads

FIGS. 13A and 13B show the spreader plate 60 that is located on the inboard side of the rotor 10, the spreader plate 60 being shown both with and without an inboard brake pad 11*a*. As will be described, in use, the spreader plate 60 is configured to be guided by the carrier 4. For clarity, the carrier 4 is not shown in FIGS. 13A and 13B. The main function of the spreader plate 60 is to spread the load applied by the single piston across the circumferential width of the inboard pad 11*a*, which is particularly useful for high pressure applications (e.g., stopping a vehicle at high speed), to more evenly distribute the load applied to the pads, and help prevent brake fade. There is also an effect on wear; i.e., wear closer to the center of the pad (where the piston is applied) can be reduced, to provide a more even distribution of wear.

Figure 14:
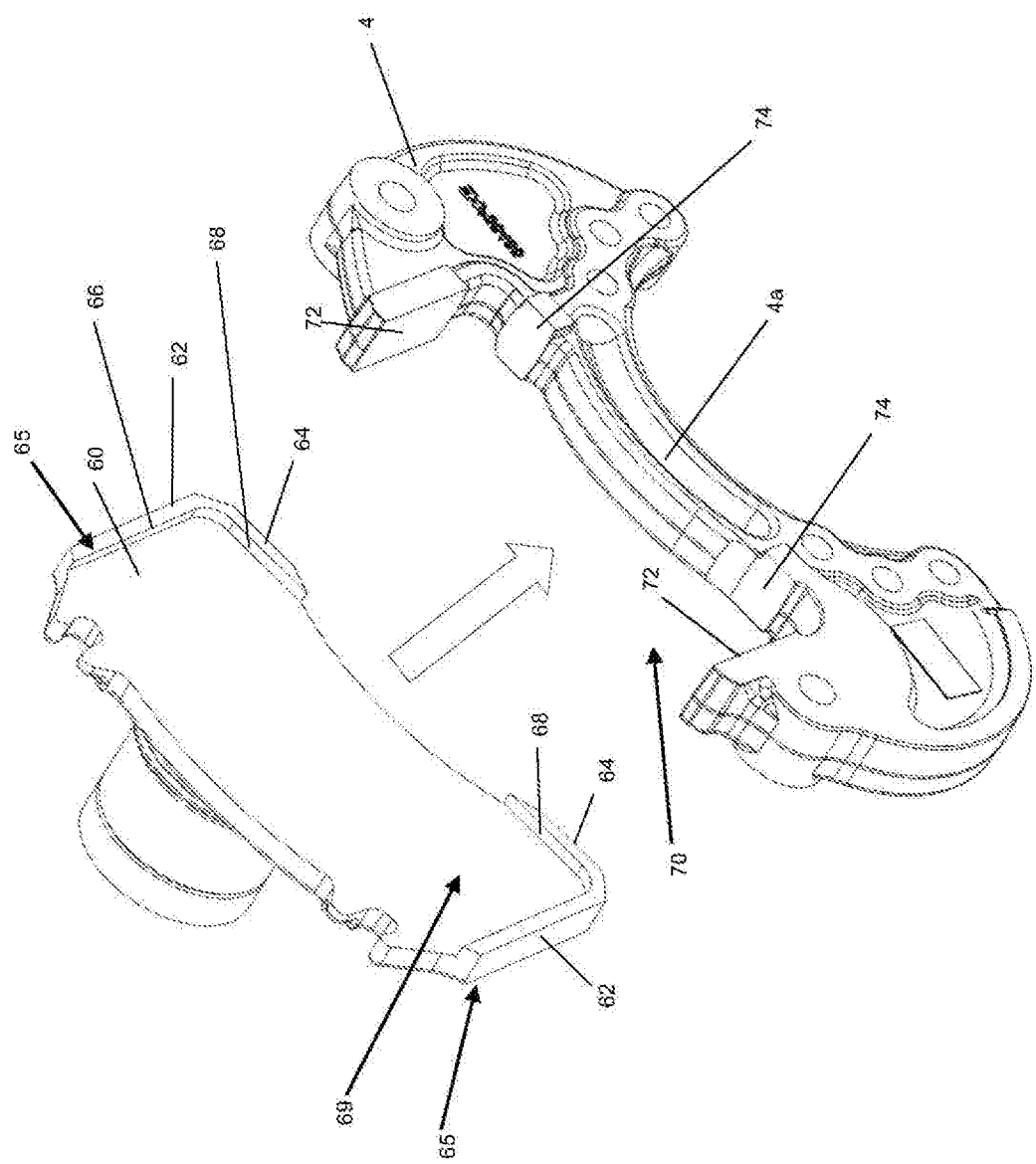
FIG. 14 is an isometric view of the spreader plate and carrier of the brake assembly of FIG. 1, showing how the spreader plate fits within the carrier.

As can be seen most clearly in FIG. 14, the carrier 4 has a spreader plate opening 70, for locating the spreader plate 60. The opening 70 is arranged to support the spreader plate 60 in a circumferential (rotational about an axis passing through the center of the rotor and pads) direction, i.e., to provide a reaction force that reacts the circumferential forces created within the brake when the piston is actuated and the pads clamp the rotor.

Within the opening 70, the carrier 4 has opposing vertical spreader plate abutment surfaces 72, located on 'arms' that project radially outward from the left and right sides of the carrier 4 (the 'left' and 'right' directions being relative to the hub of a wheel, when the carrier 4 is mounted in use).

The carrier 4 also has horizontal spreader plate abutment surfaces 74, located either side of an arched 'link' portion 4*a* of the carrier, the link portion 4*a* connecting the left and right sides of the carrier 4.

When the brake is assembled, the vertical abutment surfaces 72 contact vertical outer side surfaces 62 of the spreader plate 60, and the horizontal abutment surfaces 74 contact horizontal bottom surfaces 64 of the spreader plate 60. This arrangement restrains rotation of the spreader plate 60. As the spreader plate 60 and the outer piston 15*a* are, in this embodiment, a single integral component, then the rotation of the outer piston 15*a* is also restrained. Therefore, when the brake is actuated in use, and when the brake is adjusted, the spreader plate 60 and outer piston 15*a* are restrained from rotating.

The spreader plate 60 has two side steps 65 projecting axially outboard from the outboard surface of the spreader plate 60. Each side step 65 extends down a vertical side edge of the spreader plate and across part of the horizontal bottom edge of the spreader plate 60, to define vertical pad abutment surfaces 66 and horizontal pad abutment surfaces 68.

Preferably, the vertical pad abutment surfaces 66 and horizontal pad abutment surfaces 68 are machined, but they could be forged, or just left as cast as desired. Typically, there is a tolerance of about 0.5 mm. Machining the surfaces enables them to be used as a datum during manufacturing.

The vertical and horizontal pad abutment surfaces 66, 68 define a first pad mounting structure in the form of an opening 69 that is arranged to support the pad in a radially inward and circumferential (i.e., rotational) direction. As the brake is actuated, the abutment surfaces 66, 68 react the torque that is created as the inboard pad 11*a* clamps the rotor 10. The abutment surfaces 66, 68 also act to locate the inboard brake pad 11*a*.

Advantageously, as the forces from the inboard pad 11*a* are reacted by the side steps 65, and these forces then passed directly to the abutment surfaces 72, 74 of the carrier 4, the backplate of the inboard pad can be made significantly thinner than the backplate of brake pads in brakes of the prior art. For example, a typical backplate may have a thickness of 7 to 10 mm, whereas a backplate used in combination with the spreader plate 60 could have a thickness of 5 mm, or even lower.

Sealing of Housing

To seal the adjustment mechanism 30 within the housing 6 of the caliper 3, a cover plate 75 seals the outboard opening of the housing 6. The cover plate 75 has a central bore, which the piston 15 passes through.

As shown most clearly in FIGS. 7, 8 and 10, a sealing boot 76 is located on the piston 15, outboard of the cover plate 75. The sealing boot 76 is convoluted and creates a seal between the bore of the cover plate 75 and the outer surface of the outer piston 15*a*.

A circumferential seal 77 is provided between the cover plate 75 and the outboard opening in the caliper 3. The seal 77 generally follows the outer profile of the cover plate 75 and acts against the outboard surface of the housing 6 of the caliper and the cover plate 75 to inhibit contaminants passing through the space between the cover plate 75 and the caliper 3.

A secondary convoluted seal 78 is located inboard of the boot 76, to further inhibit contaminants passing between the outer piston 15*a* and the cover plate 75, in the event that the primary seal fails. The circular profile of the piston and sealing arrangement means that effective sealing can be achieved without complex sealing arrangements. Alternatively however, other profiles of the piston and sealing arrangement can be used and still achieve effective sealing. For example, an elliptical profile could be used, or a substantially lobular profile.

The cover plate 75 has two half-spherical protrusions 79 projecting from its inboard surface. As can be seen from particularly FIG. 8, these protrusions 79 act as a seat for the outboard ends of the two return springs 46. The inboard ends of the return springs 46 are seated on outboard extending protrusions of the yoke 20, such that when a braking operation has ceased, the operating shaft 21 is pushed back to its rest position. In an alternative arrangement, a single seal could be provided on the outer surface of the piston, to act between the outer surface of the piston and an inner surface of the cover plate. Preferably, the seal would project in a radially outward direction.

A spring clip 81 is shown in FIG. 10, which retains the cover plate in an outboard direction in a mouth of the housing 6 of the caliper 3. Alternatively, axial bolts, or other suitable fixing components, could be used (not shown). If a spring clip is used, the cover plate would be prevented from moving too far in the inboard direction by the stepped arrangement to the mouth.

Rotating Element Bearing

Rotating element bearings 20A', 20A are shown in FIG. 10 and FIGS. 12A to 12D, respectively. The rotating element bearing 20A' is shown schematically in FIG. 10. The rotating bearing element 20A is shown in detail in FIGS. 12A to 12D. The bearing includes a cage 310 and a plurality (in this case 32) of rotating elements 312. In this case all rotating elements are identical and are needle roller bearings. The cage has a plurality of apertures 321A to D, 322A to D, 323A to D, and 324A to D. There are a total of 16 apertures. Apertures 321A, 321B, 321C and 321D form a first array of apertures 321'. Apertures 322A, 322B, 322C and 322D form a second array of apertures 322'. Apertures 323A, 323B, 323C and 323D form a further first array of apertures 323'. Apertures 324A, 324B, 324C and 324D form a further second array of apertures 324'.

Each aperture of the cage receives two needle roller bearings.

The cage is generally arcuate in shape and has a first arcuate portion 314 and a second arcuate portion 316. The first and second arcuate portions are connected to each other by a single elongate connecting portion 318. The first arcuate portion 314 defines a first circumferential edge 331 opposite a second circumferential edge 332. The second arcuate portion 316 defines a third circumferential edge 333 opposite a fourth circumferential edge 334. The second circumferential edge 332 is connected to the fourth circumferential edge 334 by a fifth edge 335. The first circumferential edge 331 is connected to the second circumferential edge 332 by a sixth edge 336. The third circumferential edge 333 is connected to the fourth circumferential edge 334 by a seventh edge 337. The fifth edge 335 has a first region 335A, a second region 335B and a third region 335C.

The first edge 331 and third edge 333 define a line L.

The first circumferential edge 331 of the first arcuate portion 314 is connected to the second circumferential edge 332 of the second arcuate portion 316 by the single elongate connecting portion 318, and as such a space 340 is defined between the first and second arcuate portions 314, 316.

The elongate connecting portion 318 connects the bottom edges (when viewing FIG. 12A) of the first and second arcuate portions, in this case the first circumferential edge 331 and third circumferential edge 333. As will be appreciated an elongate section 318A of the elongate connecting portion 318 lies on a side of line L opposite the first and second arcuate portions 314 and 316. This "lowering" of the elongate section 318A relative to the first 331 and third 333 edges provides for a deeper "U" shaped space 340 than would otherwise be the case. This deep "U" shaped space 340 allows for improved packaging of various components as will be further described below.

The operating shaft has a first abutment 341 and a second abutment 342 (see FIG. 10).

Figure 15A:
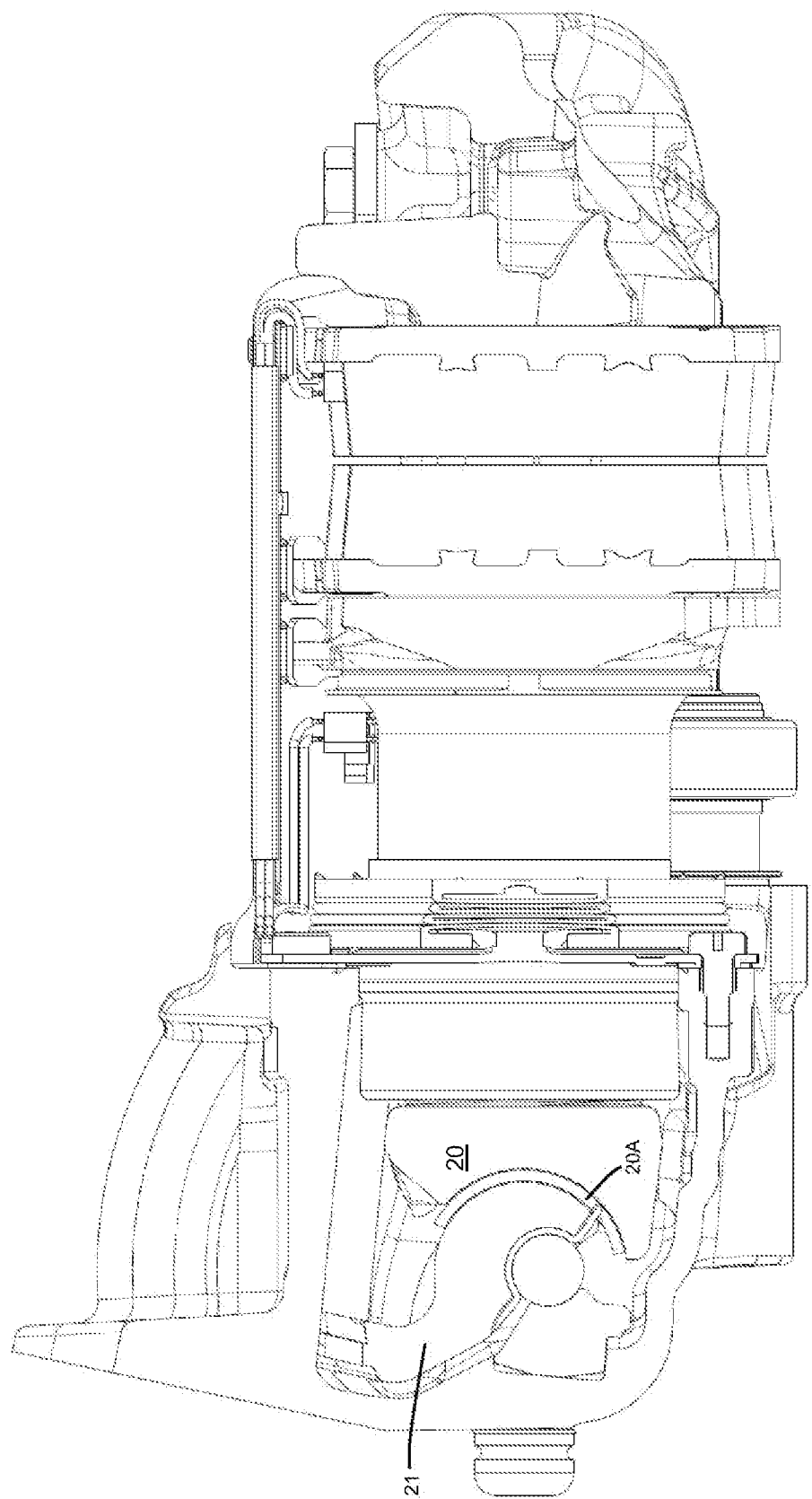
FIG. 15A is a view similar to FIG. 6 of a variant of a brake assembly according to the present invention taken in an opposite direction with the brake in a rest position.
Figure 15B:
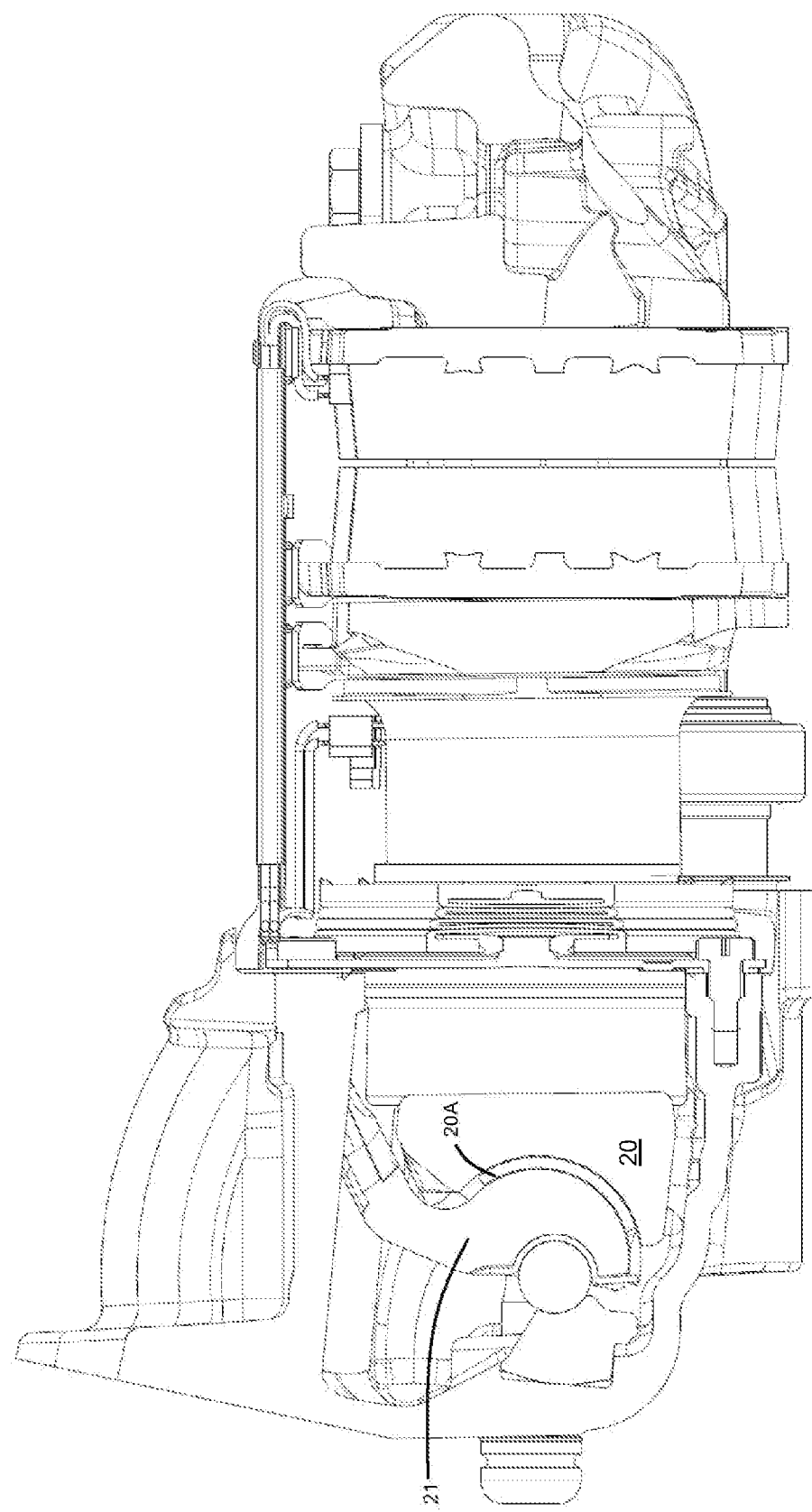
FIG. 15B is a view similar to FIG. 15A with the brake in an actuated position.
Figure 16:
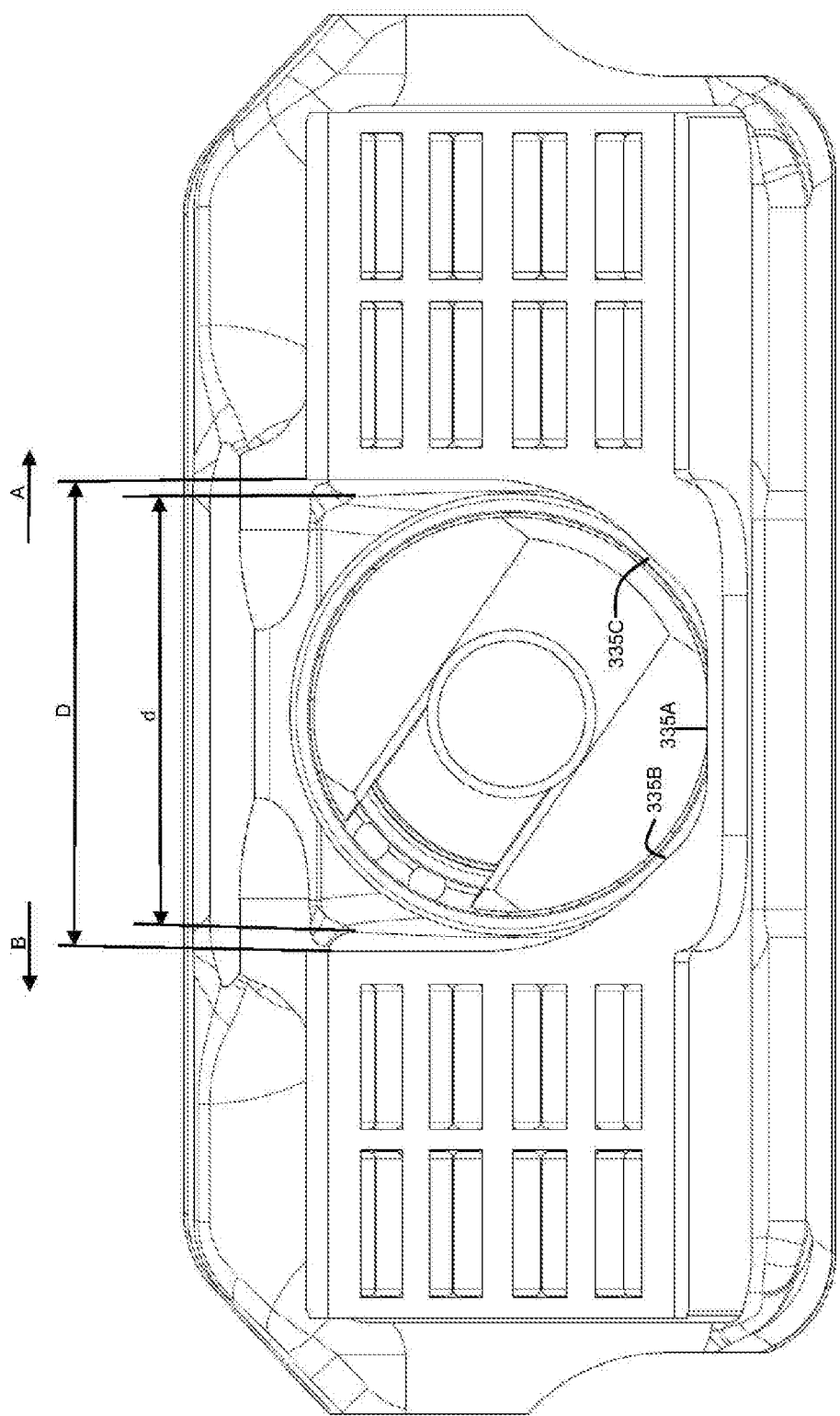
FIG. 16 is a view of the rotating element bearing and yoke of the brake assembly of FIG. 15A taken in the direction of the rotor.

FIGS. 6, 15A and 16 show the relative positions of the operating shaft 21, rotating element bearing 20A and yoke 20 when the brake is in a rest position. FIG. 15B shows the relative positions of the rotating element bearing, operating shaft and yoke when the brake is in a fully actuated position. Comparing and contrasting FIGS. 15A and 15B shows that the yoke 20 is positioned further to the right in FIG. 15B than in FIG. 15A, thereby indicating that the brake has been applied. It can also be seen that the operating shaft 21 has been rotated clockwise as shown in FIG. 15B when compared with FIG. 15A. Furthermore, the rotating element bearing 20A has been rotated and lowered in FIG. 15B when compared with FIG. 15A.

As will be appreciated, as the operating shaft rotates about axis 28 then the rotating element bearing rotates about axis 22. However, the rotating element bearing 20A rotates slower about axis 22 than the operating shaft rotates about axis 28. As an approximation for every 2 degrees of rotation of the operating shaft about axis 28, the rotating element bearing rotates about axis 22 by one degree.

In the rest position as shown in FIGS. 6, 15A and 16, the first abutment 341 of the operating shaft engages the first circumferential edge 331 of the cage and the second abutment 342 engages the third circumferential edge 333 of the cage. The first abutment 341 and second abutment 342 therefore prevent movement of the cage in an anticlockwise direction when viewing FIG. 6.

Similarly, with the brake in the rest position as shown in FIGS. 6, 15A and 16, the first region 335A of the elongate connecting portion 318 engages a lower edge of the adjuster mechanism. This contact prevents rotating element bearing moving in a clockwise direction when viewing FIG. 6. Thus, if during a brake operation the rotating element bearing is caused to slip downwards, then as the brake is released and returned to its rest position, the first and second abutments 341 and 342 of the operating shaft will ensure the cage is returned to its proper rest position as the operating shaft itself returns to its rest position. Equally, if during brake operation the rotating element bearing does not rotate enough around axis 22, and hence is positioned relatively higher during that particular brake operation, as the brake is released and the operating shaft is returned to its normal position, the first region 335A will abut the adjuster mechanism and reposition the rotating element bearing in its correct position relative to the operating shaft. As will be appreciated, the first and third edges 331 and 333 in conjunction with the first and second abutments 341 and 342 on the operating shafts and the first region 335A in conjunction with the adjuster mechanism ensure that each time the brake is released any minor misalignment of the rotating element bearing in a circumferential direction is corrected.

In one embodiment, a similar correction for axial offset can be arranged. Thus, in the rest position the second region 335B abuts an adjacent part of the adjuster mechanism and the third region 335C abuts an adjacent region of the adjuster mechanism. The engagement between the second region 335B and the adjuster mechanism prevents the cage moving in the direction of arrow A and the engagement between the third region 335C and the adjuster mechanism prevents the cage moving in the direction of arrow B.

As can be seen from FIG. 16 the distance D between those parts of the fifth edge above the second region 335B and third region 335C is greater than the diameter d of the adjuster mechanism. As the brake is applied, the rotating element bearing moves generally downwardly when viewing FIG. 16 (towards the FIG. 15B position) and as such regions 335B and 335C disengage from the adjuster mechanism and no longer restrict axial movement of the rotating element bearing. If during brake operation the rotating element bearing becomes slightly axially misaligned, then as the brake is released and the operating shaft is returned to its rest position, the first and second abutments 341 and 342, pushing generally upwardly as shown in FIG. 16 on the first and third circumferential edges 331 and 333 will cause engagement between the second region 335B and the adjuster mechanism and/or engagement between the third region 335C and the adjuster mechanism thereby centralizing the rotating element left and right when viewing FIG. 16. As described above the second region 335B and third region 335C engage different parts of the same component, in the example above different parts of the adjuster mechanism. In further embodiments the second region 335B may engage a different component to that engaged by the third region 335C.

The second circumferential edge 332 may also be referred to as a primary circumferential edge. The fourth circumferential edge 334 may also be referred to as a secondary circumferential edge. The fifth edge 335 may also be referred to as a tertiary edge. As described above the first region 335A and second region 335B of the fifth edge (tertiary edge) prevent movement of the rotating element bearing in a first and second axial direction. This aspect of the present invention is independent of the single elongate connecting portion.

In further embodiments, centralizing of the rotating element bearing left and right (i.e., helping to prevent movement of the rotating element bearing in the first and second axial directions) may occur as a result of a first formation on the yoke engaging a first formation on the sixth edge of the cage and a further, oppositely facing second formation on the yoke, engaging a second formation on the seventh edge of the cage. In one embodiment, an abutment on the yoke engages the sixth edge of the cage and a further oppositely facing abutment on the yoke engages the seventh edge of the cage.

Thus the sixth edge 336 may be considered as a first arcuate edge of the first arcuate portion 314 wherein the edge faces axially away from the seventh edge 337 which may be considered as a second arcuate edge of the second arcuate portion 316 and the yoke has a first abutment axially facing the first arcuate edge (336) and the yoke has a second abutment axially facing the second arcuate edge (337) so as to limit axial movement of the cage relative to the yoke. The first abutment on the yoke and/or the second abutment on the yoke may be arcuate abutments which project radially from an end or ends of the arcuate concave bearing surface of the yoke.

In a different embodiment, centralizing of the rotating element bearing left and right may occur as a result of an abutment at the sixth edge of the cage engaging the yoke and a further, oppositely facing abutment at the seventh edge of the cage engaging the yoke.

Figure 18B:
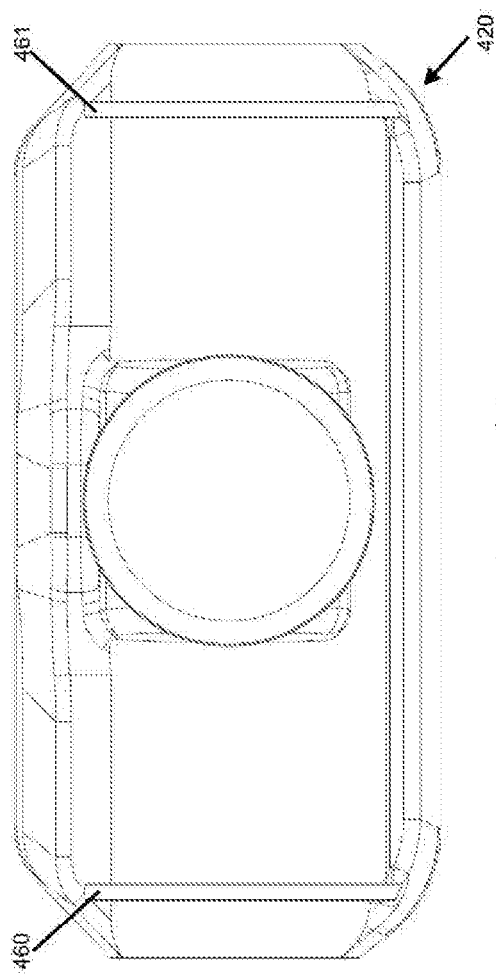
FIG. 18B is a view of the yoke of FIG. 18A without the rotating element, taken in the direction of the rotor.
Figure 18A:
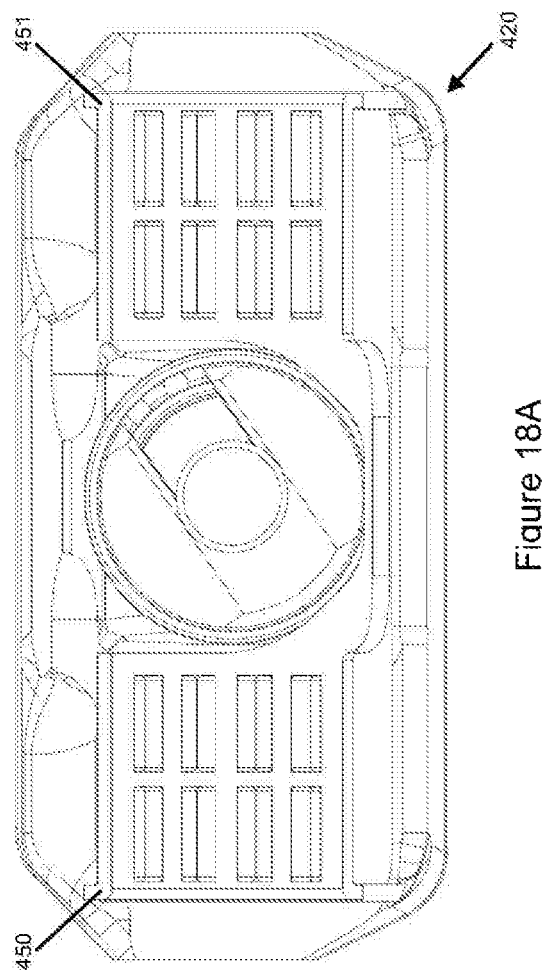
FIG. 18A is a view of the rotating element bearing of FIGS. 17A to 17D when located in a yoke of a brake assembly, taken in the direction of the rotor.
Figure 19B:
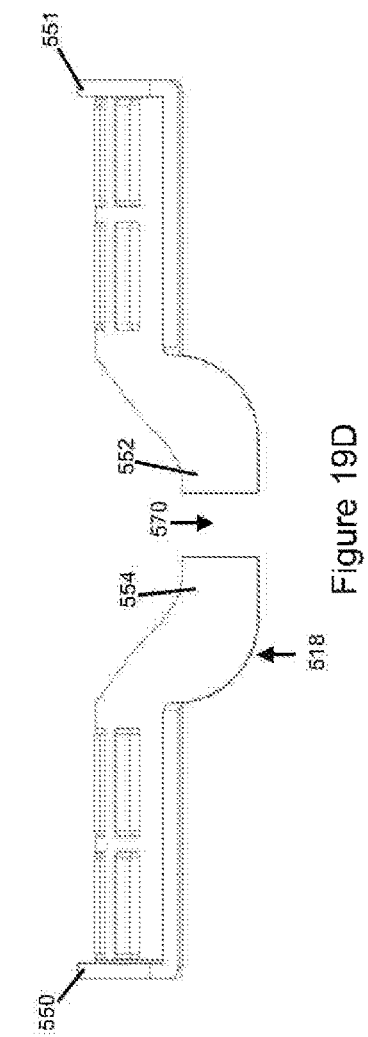
FIGS. 19A to 19D show various views of a different rotating element bearing.
Figure 19D:
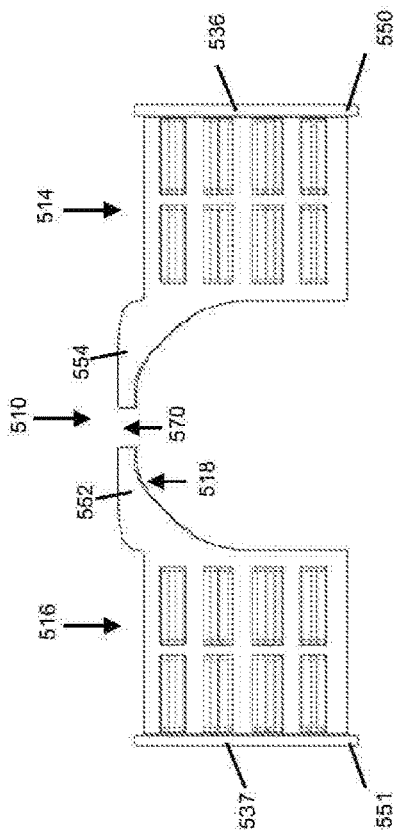
Figure 19A:
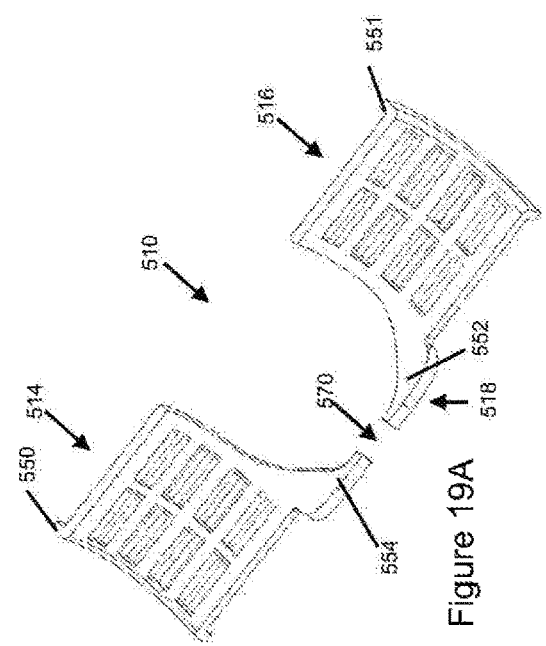
Figure 19C:
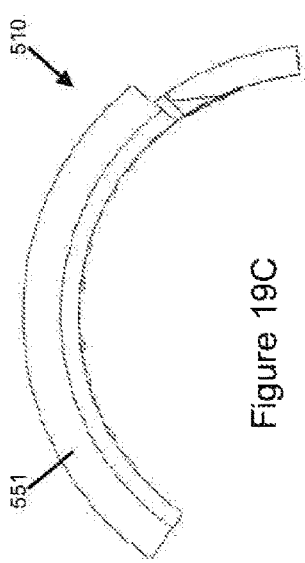

An example of this is shown in FIGS. 17 and 18. The cage 410 again has a first arcuate portion 414 and a second arcuate portion 416. However, in this embodiment, the sixth edge 436 has an abutment in the form of a first arcuate flange 450 and the seventh edge 437 has an abutment is the form of a second arcuate flange 451. The first and second arcuate flanges 450, 451 both project in a generally axial direction from the remainder of the cage 410. The first arcuate flange 450 extends along substantially the entire arc length of the sixth edge 436 of the first arcuate portion 414. The second arcuate flange 451 extends along substantially the entire arc length of the seventh edge 437 of the second arcuate portion 416.

The yoke 420 has a first groove 460 arranged to axially face the first arcuate flange 450 when the brake is assembled. The yoke 420 also has a second groove 461 arranged to axially face the second arcuate flange 451 when the brake is assembled. In this embodiment, the grooves are approximately 2 mm in both width and depth.

Therefore, in use, the first arcuate flange 450 engages in the first groove 460 and the second arcuate flange 451 engages in the second groove 461 to limit side-to-side movement of the cage 410 relative to the yoke 420. The first and second grooves 460, 461 extend in a generally radial direction for substantially the entire height of the inboard surface of the semi-circular recess of the yoke 420. Advantageously, the semi-circular recess can be manufactured by machining in the circumferential direction C through the entire yoke 420, e.g., by using a boring tool to form the shape of the recess, from one side of the yoke. Then, a simple machining process (e.g., a milling process) can create the first and second grooves 460, 461. No further machining steps would be necessary for the rotating element bearing to be retained circumferentially relative to the yoke.

In some alternative embodiments, the first arcuate portion and the second arcuate portion may be separate components not physically connected to one another. For example, the first arcuate portion and the second arcuate portion may be separated by an air gap. In one embodiment, shown in FIGS. 19A to 19D, there is an elongate portion 518 extending between the first and second arcuate portions, but the elongate portion is made up of first and second parts 552, 554 separated by an air gap 570. At least one of the first and second parts 552, 554 engages a component of the brake assembly to prevent movement of the rotating element bearing 510 in a second axial direction opposite the first axial direction, as is the case in the single elongate portion embodiment described above. In another embodiment not illustrated, there may be no elongate connecting portion at all. In another embodiment, there may be first and second parts of the elongate portion, but the first and second parts may engage one another so there is no air gap.

In some embodiments, there may be no grooves on the yoke at all. Instead, the flanges on the rotating element bearing engage abutments on the yoke, e.g., surfaces at the outer edges or adjacent the adjuster mechanism to prevent movement of the rotating element bearing in the first and second axial directions.

Further, the rotating element bearing may only have a formation on one of the arcuate portions, to engage with a single formation on the yoke to prevent movement of the rotating element bearing in the first and second axial directions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
an operating shaft configured to rotate about a first axis to actuate a brake pad, the first axis being defined by a body of the brake assembly, the operating shaft including a convex bearing surface being arcuate and defining a second axis disposed parallel to the first axis and offset from the first axis;
a yoke having an arcuate concave bearing surface, the yoke being configured to move linearly relative to the body as the operating shaft rotates about the first axis; and
a rotating element bearing having a plurality of rotating elements retained by a cage, the cage having a first arcuate portion having a first array of apertures for receiving some of the plurality of rotating elements, and a second arcuate portion having a second array of apertures for receiving some of the plurality of rotating elements, the first arcuate portion being connected to the second arcuate portion by a single elongate connecting portion, wherein the rotating element bearing is positioned between the convex bearing surface and the concave bearing surface such that the rotating element bearing is configured to move relative to the operating shaft and relative to the yoke during actuation of the brake pad;
wherein the first arcuate portion has a first circumferential edge and a second circumferential edge, and the second arcuate portion has a third circumferential edge and a fourth circumferential edge, wherein the elongate connecting portion connects the first circumferential edge to the third circumferential edge, thereby defining a space between the first arcuate portion and the second arcuate portion, the first circumferential edge and the third circumferential edge define a line, the second circumferential edge and the fourth circumferential edge are located on a first side of the line, and an elongate section of the elongate connecting portion is located on a second side of the line opposite the first side.

2. The brake assembly of claim 1 further comprising a rest position in which the operating shaft, rotating element bearing, and yoke are in a first position relative to each other, and an actuated position in which the operating shaft, rotating element bearing, and yoke are in a second position relative to each other.

3. The brake assembly of claim 2 wherein the second circumferential edge is connected to the fourth circumferential edge by a fifth edge of the cage, wherein with the brake assembly in the rest position a first part of the fifth edge engages a component of the brake assembly to prevent movement of the rotating element bearing in a first axial direction and a second part of the fifth edge engages the component of the brake assembly to prevent movement of the rotating element bearing in a second axial direction opposite the first axial direction.

4. The brake assembly of claim 3 wherein the component is configured to move in a linear direction relative to a housing of the brake assembly.

5. The brake assembly of claim 4 wherein the component is a part of an adjuster mechanism.

6. The brake assembly of claim 3 wherein with the brake assembly in the actuated position, the fifth edge is spaced from the component, the fifth edge thereby not preventing movement of the rotating element bearing in the first or second axial direction.

7. The brake assembly of claim 2 wherein with the brake assembly in the rest position a first abutment of the operating shaft engages the first circumferential edge and a second abutment of the operating shaft engages the third circumferential edge to prevent movement of the rotating element bearing in a first circumferential direction.

8. The brake assembly of claim 7 wherein with the brake assembly in the rest position an edge of the elongate connecting portion engages a component of the brake assembly to prevent movement of the rotating element bearing in a second circumferential direction opposite to the first circumferential direction.

9. The brake assembly of claim 2 wherein the first circumferential edge is connected to the second circumferential edge by a sixth edge having a first formation and the third circumferential edge is connected to the fourth circumferential edge by a seventh edge having a second formation and the yoke also comprises first and second formations,
wherein, with the brake assembly in the rest position, the first formation on the yoke engages the first formation on the sixth edge of the cage to help prevent movement of the rotating element bearing in a second axial direction and the second formation on the yoke engages the second formation on the seventh edge of the cage, to help prevent movement in a first axial direction opposite the second axial direction.

10. The brake assembly of claim 9 wherein the first formation on the yoke is a first groove and the first formation on the sixth edge is a first flange projecting axially from the cage and the second formation on the yoke is a second groove and the second formation on the seventh edge is a second flange projecting axially from the cage.

11. The brake assembly of claim 1 wherein the first arcuate portion has a further first array of apertures for receiving some of the rotating elements and the second arcuate portion has a further second array of apertures for receiving some of the rotating elements.

12. A brake assembly comprising:
an operating shaft configured to rotate about a first axis to actuate a brake pad, the first axis being defined by a body of the brake assembly, the operating shaft including a convex bearing surface being arcuate and defining a second axis disposed parallel to the first axis and offset from the first axis;
a yoke having an arcuate concave bearing surface, the yoke being configured to move linearly relative to the body as the operating shaft rotates about the first axis; and
a rotating element bearing having a plurality of rotating elements retained by a cage, the cage having a first arcuate portion having a first array of apertures for receiving some of the plurality of rotating elements and a second arcuate portion having a second array of apertures for receiving some of the plurality of rotating elements, the first arcuate portion being connected to the second arcuate portion by a single elongate connecting portion, wherein the rotating element bearing is positioned between the convex bearing surface and the concave bearing surface such that the rotating element bearing is configured to move relative to the operating shaft and relative to the yoke during actuation of the brake pad, wherein the first arcuate portion has a first circumferential edge and a second circumferential edge, and the second arcuate portion has a third circumferential edge and a fourth circumferential edge, wherein the elongate connecting portion connects the first circumferential edge to the third circumferential edge, thereby defining a space between the first arcuate portion and the second arcuate portion, the first circumferential edge and the third circumferential edge define a line, the second circumferential edge and the fourth circumferential edge are located on a first side of the line, and an elongate section of the elongate connecting portion is located on a second side of the line opposite the first side;
wherein the brake assembly is configured to have a rest position in which the operating shaft, rotating element bearing, and yoke are in a first position relative to each other and an actuated position in which the operating shaft, rotating element bearing, and yoke are in a second position relative to each other; and
wherein a primary circumferential edge of the cage is connected to a secondary circumferential edge of the cage by a tertiary edge of the cage, wherein with the brake assembly in the rest position a first part of the tertiary edge engages a component of the brake assembly to prevent movement of the rotating element bearing in a first axial direction and a second part of the tertiary edge engages the component of the brake assembly to prevent movement of the rotating element bearing in a second axial direction opposite the first axial direction.

13. The brake assembly of claim 12 wherein the component is configured to move in a linear direction relative to a housing of the brake assembly.

14. The brake assembly of claim 13 wherein the component is a part of an adjuster mechanism.

15. A brake assembly comprising:

an operating shaft configured to rotate about a first axis to actuate a brake pad, the first axis being defined by a body of the brake assembly, the operating shaft including a convex bearing surface being arcuate and defining a second axis disposed parallel to the first axis and offset from the first axis;

a yoke having an arcuate concave bearing surface, the yoke being configured to move linearly relative to the body as the operating shaft rotates about the first axis, a rotating element bearing having a plurality of rotating elements retained by a cage, the cage having a first arcuate portion having a first array of apertures for receiving some of the plurality of rotating elements and a second arcuate portion having a second array of apertures for receiving some of the plurality of rotating elements, the first arcuate portion being connected to the second arcuate portion by a single elongate connecting portion, wherein the rotating element bearing is positioned between the convex bearing surface and the concave bearing surface such that the rotating element bearing is configured to move relative to the operating shaft and relative to the yoke during actuation of the brake pad, wherein the first arcuate portion has a first circumferential edge and a second circumferential edge, and the second arcuate portion has a third circumferential edge and a fourth circumferential edge, wherein the elongate connecting portion connects the first circumferential edge to the third circumferential edge, thereby defining a space between the first arcuate portion and the second arcuate portion, the first circumferential edge and the third circumferential edge define a line, the second circumferential edge and the fourth circumferential edge are located on a first side of the line, and an elongate section of the elongate connecting portion is located on a second side of the line opposite the first side;

wherein the brake assembly is configured to have a rest position in which the operating shaft, rotating element bearing, and yoke are in a first position relative to each other and an actuated position in which the operating shaft, rotating element bearing, and yoke are in a second position relative to each other; and wherein a first arcuate edge of the first arcuate portion faces axially away from a second arcuate edge of the second arcuate portion, and the yoke has a first abutment axially facing the first arcuate edge and the yoke has a second abutment axially facing the second arcuate edge so as to limit axial movement of the cage relative to the yoke.

16. The brake assembly of claim 15 wherein the first abutment of the yoke is an arcuate abutment that projects radially from an end of the arcuate concave bearing surface.

17. The brake assembly of claim 15 wherein the second abutment of the yoke is an arcuate abutment that projects radially from an end of the arcuate concave bearing surface.

18. The brake assembly of claim 15 wherein the first abutment and the second abutment are arcuate abutments that project from ends of the arcuate concave bearing surface.

* * * * *